(12) United States Patent
Yang

(10) Patent No.: US 8,852,723 B2
(45) Date of Patent: Oct. 7, 2014

(54) AIR CUSHION PAD

(71) Applicant: Universal Trim Supply Co., Ltd., New Taipei (TW)

(72) Inventor: Shih-Sheng Yang, New Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 13/756,551

(22) Filed: Feb. 1, 2013

(65) Prior Publication Data

US 2013/0142985 A1 Jun. 6, 2013

Related U.S. Application Data

(62) Division of application No. 12/701,591, filed on Feb. 7, 2010.

(51) Int. Cl.
| | |
|---|---|
| *B32B 3/12* | (2006.01) |
| *B32B 3/26* | (2006.01) |
| *F16F 9/04* | (2006.01) |
| *A41D 13/05* | (2006.01) |
| *A41D 13/015* | (2006.01) |
| *A41D 31/00* | (2006.01) |

(52) U.S. Cl.
CPC ............. *B32B 3/12* (2013.01); *F16F 9/0418* (2013.01); *A41D 13/0512* (2013.01); *A41D 13/0156* (2013.01); *A41D 31/005* (2013.01); *A41D 13/0155* (2013.01)
USPC ........... 428/172; 428/137; 428/156; 428/158; 428/161

(58) Field of Classification Search
USPC .................. 428/178, 131, 137, 138
See application file for complete search history.

(56) References Cited

U.S. PATENT DOCUMENTS 4,432,099 A * 2/1984 Grick et al. ............. 2/412
4,951,689 A * 8/1990 Jones ..................... 2/161.1

\* cited by examiner

*Primary Examiner* — Aaron Austin
*Assistant Examiner* — Megha Mehta
(74) *Attorney, Agent, or Firm* — Leong C. Lei

(57) ABSTRACT

An air cushion pad includes at least two sheet members, which are made of resilient materials. Each sheet member forms a plurality of hollow tubes projecting therefrom and the tubes are connected to each other by a substantially flat plate. The tubes of one sheet member and the tubes of the other sheet member are alternately fit to each other in an opposing manner to form the air cushion pad. When an external impact force is applied in a top down manner, the air cushion pad absorbs the impact force and undergoes sideways deformation so as to convert the impact force into a transverse to thereby realize shock absorption and eliminate damage caused by downward action of the impact force to provide the function of protection.

17 Claims, 25 Drawing Sheets

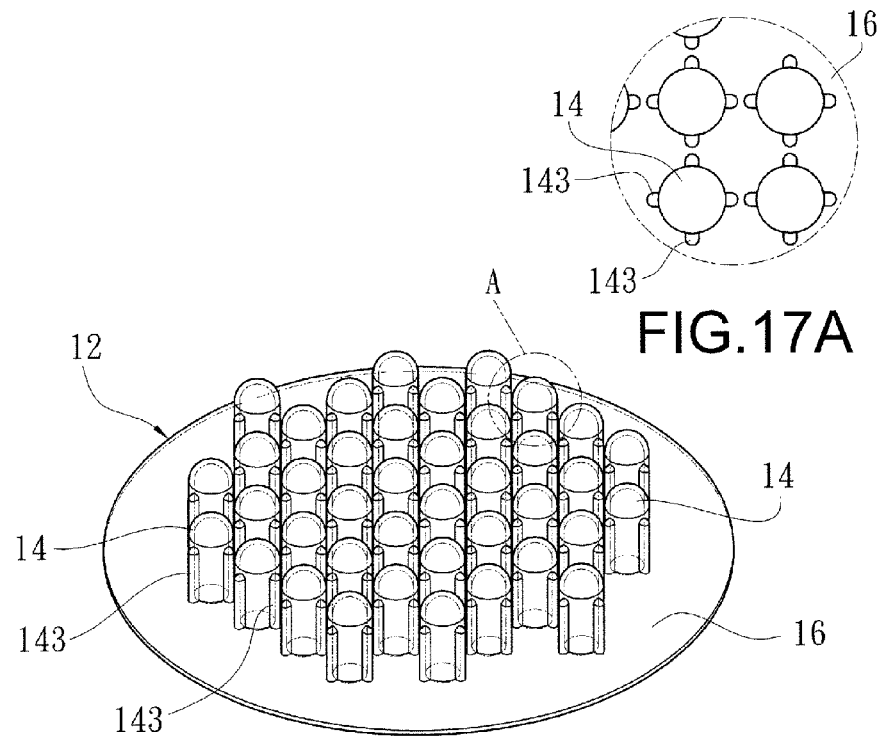
FIG.17A
FIG.17
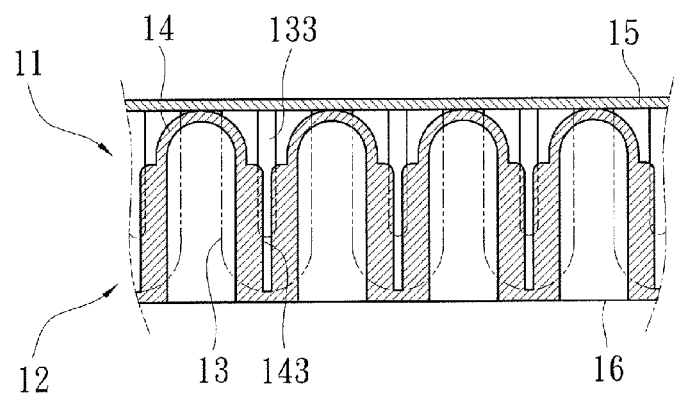
FIG.18

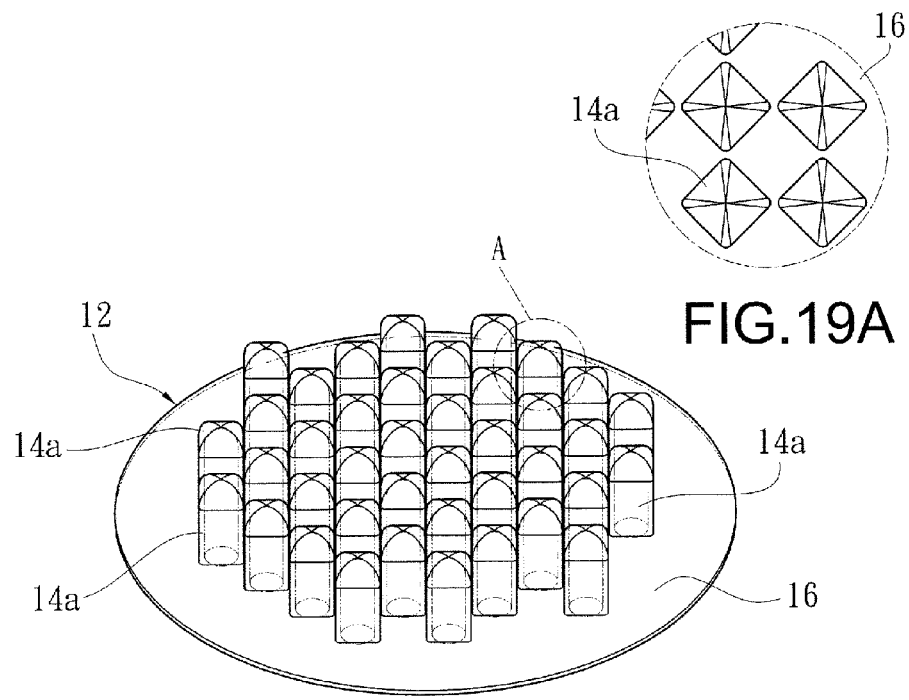
FIG.19A
FIG.19
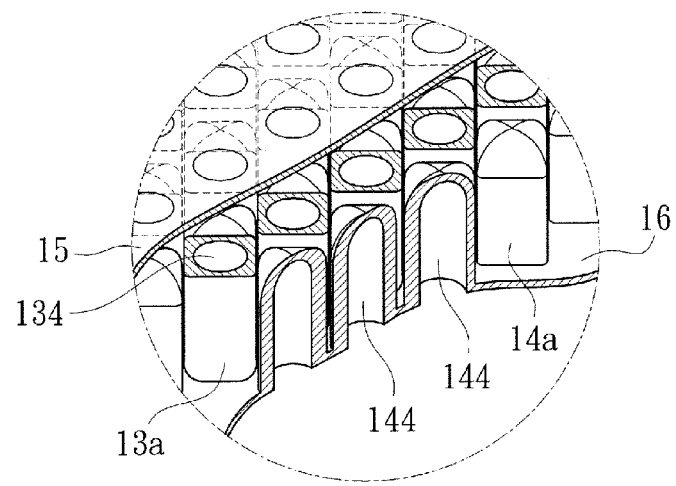
FIG.20

AIR CUSHION PAD

CROSS-REFERENCE TO RELATED APPLICATION

This application is a divisional of U.S. patent application Ser. No. 12/701,591, filed on Feb. 7, 2010.

BACKGROUND OF THE INVENTION (a) Technical Field of the Invention

The present invention generally relates to an air cushion pad that provides multiple modes of shock absorption and impact cushioning and is applicable to cushioning materials that bears pressure load, such as shoulder pads, seat cushions, wrist protectors, and shoe insole, and sports gloves that require shock absorption and impact cushioning for a contact surface or internal lining cushion of sports helmets.

(b) Description of the Prior Art

Impact cushioning and shock absorption materials that are commonly available in the market include rubber pads, foamed material pads, or air sack pads, which are applicable to different fields requiring different aspect of cushioning protections. Tanking sports glove, such as batting gloves worn by a batter of base ball, as an example, the batting gloves are made of fabrics or leathers and a batter wears the gloves to isolate the bat and his or her hand skin in order to eliminate potential risk of skidding caused by sweat when the batter tightly holds the bat and thus allowing the batter to well control the direction of force application when he or she swings the bat to hit a ball. The batting glove is often provided with a shock absorption cushion pad, which is a thin pad for hand compliance as well as absorption of shock to eventually improve the performance of hitting.

As to sports helmets, some are known from for example Taiwan Patent Application No. 97217691, which discloses a sports helmet in which an inner lining made in the form of air permeable air sack through injection molding of rubber is arranged. The inner lining has a surface forming a plurality of projecting pillars and is coupled, at the same side, to a cushion pad made of a stiffer resilient material. On the coupling surface, the cushion pad forms a plurality of cones to couple to resilient hollow air passage posts of the air sack inner lining. For such a lining cushion device, since the inner lining set on one side is made in the form of permeable air sack and has a surface forming a plurality of projecting pillars, when it is subjected to a great impact force, the rubber made projecting pillar provide an effect of cushioning due to the material thereof, but the force that they can bear is only that having a component in a normal direction. Further, the air sack, due to the air enclosed therein being set in a predetermine space, is only capable to bear a force component of an impact that is in the normal direction, and the performance of resistance against a force in a transverse direction is poor because of the enclosed air sack being not supported in the transverse direction, which leads to poor cushioning performance when compressed by an external force. Thus, such a cushion pad does not provide high performance of cushioning.

In view of above discussed problems, it is desired to have an air cushion pad that is of a unique structure for applications of both light and heavy impacts or shocks to offer excellent effects of shock absorption and impact cushioning for both applications.

SUMMARY OF THE INVENTION

The primary objective of the present invention is to provide an air cushion pad, which has a simple structure, is easy to manufacture, and shows excellent effects for absorbing vibrations and cushioning impacts.

Another objective of the present invention is to provide an air cushion pad having a structure that is composed of a pad body that can be made as either a thin pad or a thick pad or that can be made as a cushioning pad having either a small area or a large area, so as to allow for expanded applications in various industries.

To achieve the above objectives, the present invention provides an air cushion pad, which is composed of at least two sheet members, including an upper sheet member and a lower sheet member, both being made of resilient materials. Each sheet member forms a plurality of hollow tubes projecting therefrom and the tubes are connected to each other by a substantially flat plate. The tubes of the upper sheet member and the tubes of the lower sheet member are alternately fit to each other in an opposing manner to form the air cushion pad that provides the effects of shock absorption and protection.

The air cushion pad may further comprise outer enclosure films that respectively set on and covers outer sides of the upper and lower sheet members. Outer circumferences of the two outer enclosure films are sealed together so that the two outer enclosure films form therebetween a hermetically enclosed air sack. Optionally, air valves can be additionally mounted to the outer circumferences of the outer enclosure films.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 17 is a perspective view showing an upper sheet member of an air cushion pad in accordance with a further embodiment of the present invention.

FIG. 17A is an enlarged view of a portion of the upper sheet member shown in FIG. 17.

FIG. 18 is a cross-sectional view showing the upper sheet member of FIG. 17 assembled to a lower sheet member of the same structure.

FIG. 19 is a perspective view showing an upper sheet member of an air cushion pad in accordance with a further embodiment of the present invention.

FIG. 19A is a top plan view of a portion of the upper sheet member shown in FIG. 19.

FIG. 20 is a perspective view, partially broken, showing the upper sheet member of FIG. 19 assembled to a lower sheet member of the same structure.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
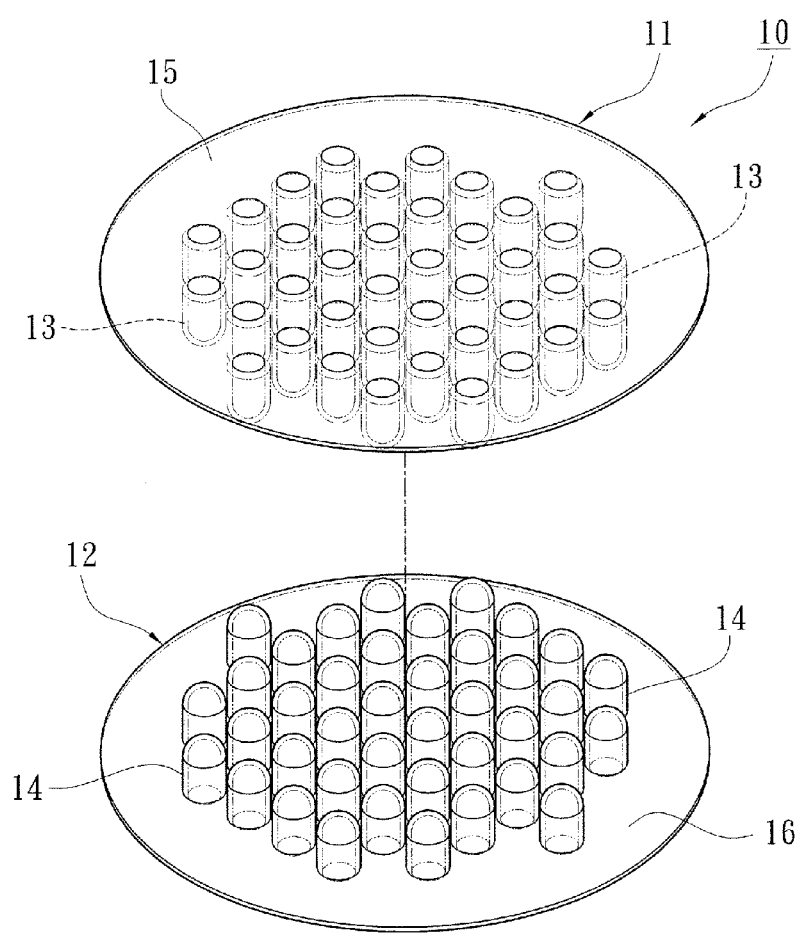
FIG. 1 is an exploded view of an air cushion pad constructed in accordance with a first embodiment of the present invention.
Figure 2:
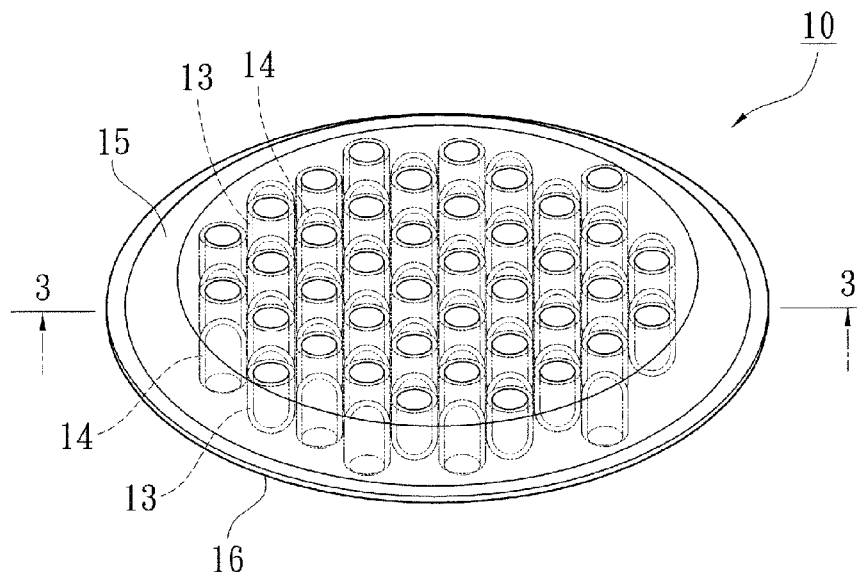
FIG. 2 is a perspective view of the air cushion pad of the first embodiment of the present invention in an assembled form.
Figure 3:
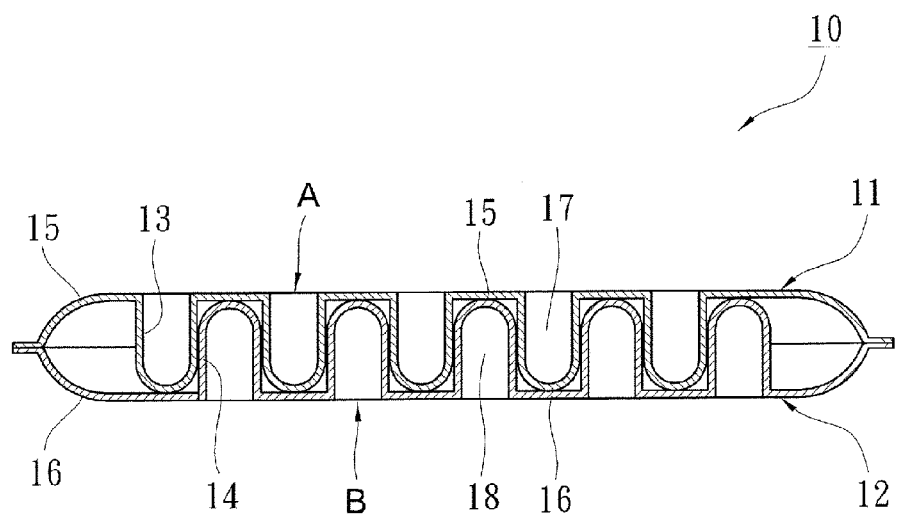
FIG. 3 is a cross-sectional view taken along line 3-3 of FIG. 2.

Referring to FIGS. 1-3, an air cushion pad constructed in accordance with an embodiment of the present invention, generally designated at 10, generally comprises an upper sheet member 11 and a lower sheet member 12. The upper and lower sheet members are made of resilient materials and are preferably structured in substantially the same way so that the upper sheet member 11 forms hollow tubes 13 integrally projecting therefrom and the lower sheet member 12 forms hollow tubes 14 integrally projecting therefrom. The tubes 13 are connected to each other by a substantially flat plate 15 and the tubes 14 are connected to each other by a substantially flat plate 16, whereby the distance between adjacent tubes of the plate 15, 16 is substantially corresponding to or slightly greater than a diameter of the tubes 13, 14 and thus the projecting hollow tubes 13 and the projecting hollow tubes 14 are allowed to alternately fit between each other in an opposing manner as shown in FIG. 3 with tip ends of the tubes 13, 14, which are rounded or dome-shaped in the instant embodiment, positioned against the plate 16, 15. Consequently, every four tubes 13 surround and define therebetween a cushioning and deformation space B, while every four tubes 14 surround and define therebetween a cushioning and deformation space A. The tubes 13, 14 can be constructed to have any desired height, and further, the tubes 13, 14 can also be constructed to have any desired diameter.

Figure 4A:
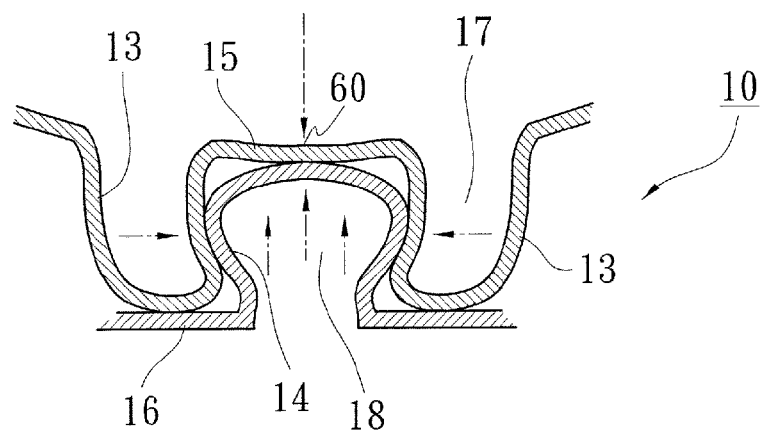
FIG. 4A is a cross-sectional view schematically illustrating deformation of the air cushion pad of the first embodiment of the present invention acted upon by a normal force.

Referring to FIG. 4A, when the cushion pad 10 of the present invention is subjected to compression by a normal force, firstly, a compression site 60 is induced on a surface of the plate 15, and then the force acting on the compression site progresses downward to cause a normal deformation of the plate 15. The deformation of the plate is further transmitted to the tubes 14 of the lower sheet member, causing tubular walls of tubes 14 to deform. The tubular walls of tubes 14, when deformed, are caused to squeeze the tubular walls of the tubes 13 that are in engagement therewith. The force or shock caused thereby is thus absorbed by resilient deformations induced in a single tube 14 and four adjacent tubes 13 so as to realize an effect of cushioning.

Further, besides the shock absorption realized by the deformation of the tubular walls of the tubes 13, 14, the interior of each tube 13, 14, which forms a cavity 17, 18 in the form of an open space, is subjected to the deformation of the tubular wall of the tube 13, 14 to have air contained in the cavity 17, 18 to be compressed and expelled outward. Since the speed that air is expelled outward is slower than the speed that the shock acts on the tubes, an effect of cushioning is induced. Consequently, the air cushion pad 10 of the present invention provides an excellent cushioning effect when acted upon by a normal force.

Figure 4B:
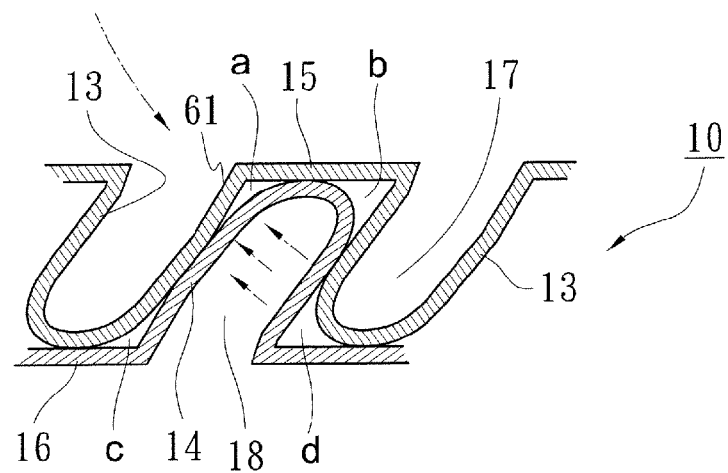
FIG. 4B is a cross-sectional view schematically illustrating deformation of the air cushion pad of the first embodiment of the present invention acted upon by an inclined force.

Referring to FIG. 4B, when the cushion pad 10 of the present invention is subjected to compression by an inclined force, firstly, a force acting on and compressing a compression site 61 downward is transmitted downward in an inclined direction to cause an inclined deformation of the plate 15. The deformation of the plate is further transmitted to the tubes 14 of the lower sheet member, causing the tubular walls of the tubes 14 to deform. The tubular walls of the tubes 14, when deformed, are caused to squeeze the tubular walls of the tubes 13 that are in engagement therewith. Since the tubes 14 abut a surface of the plate 15, with the tight engagement formed between the tubular walls of the tubes 13, 14, the deformation of tubular walls make gaps a and b formed on the upper side not corresponding to each other and limited amounts of air contained in the enclosed spaces of the gaps, due to the compression and deformation of the tubular walls, make the spaces of the gaps unsymmetrical so as to induce compression of the air. The same phenomenon is also applicable to gaps c and d on the lower side where the tubes 13 abut a surface of the plate 16. The lower side gaps c and d are also caused to be unsymmetrical due to the deformation of the tubular walls, and the limited amounts of air contained in the enclosed spaces of the gaps are forced to displace and compress, leading to an effect of delaying, which provides an effect of cushioning. Consequently, the air cushion pad 10 of the present invention provides an excellent cushioning effect when acted upon by an inclined force.

Figure 5:
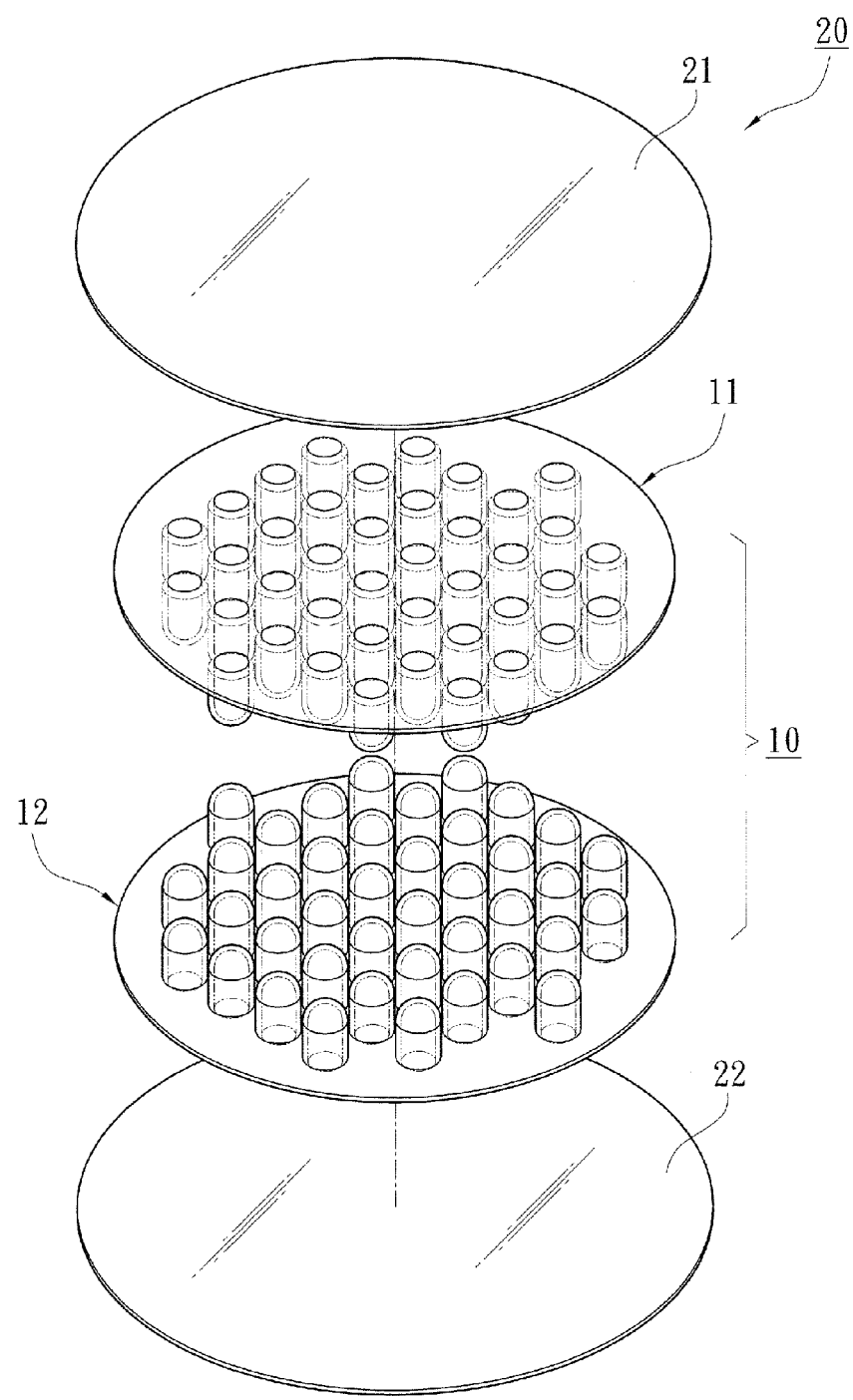
FIG. 5 is an exploded view of an air cushion pad constructed in accordance with a second embodiment of the present invention.
Figure 6:
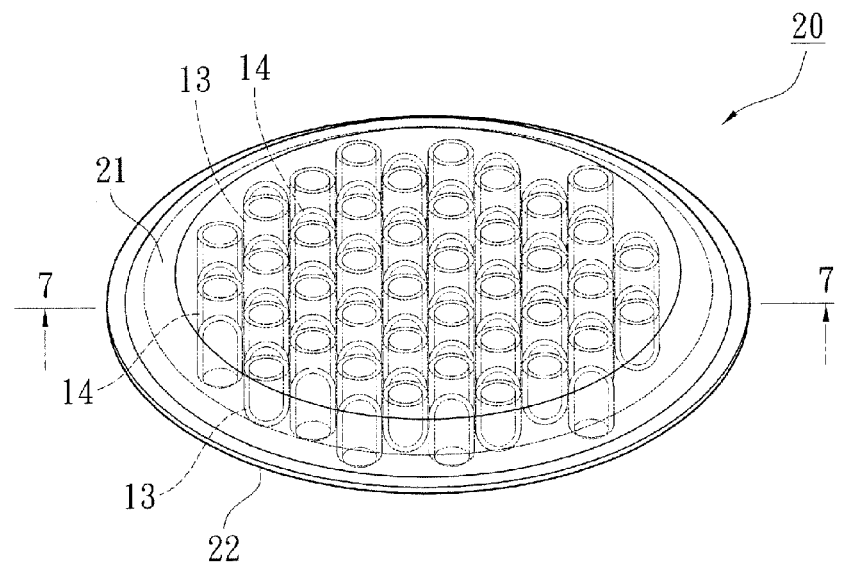
FIG. 6 is a perspective view of the air cushion pad of the second embodiment of the present invention in an assembled form.
Figure 7:
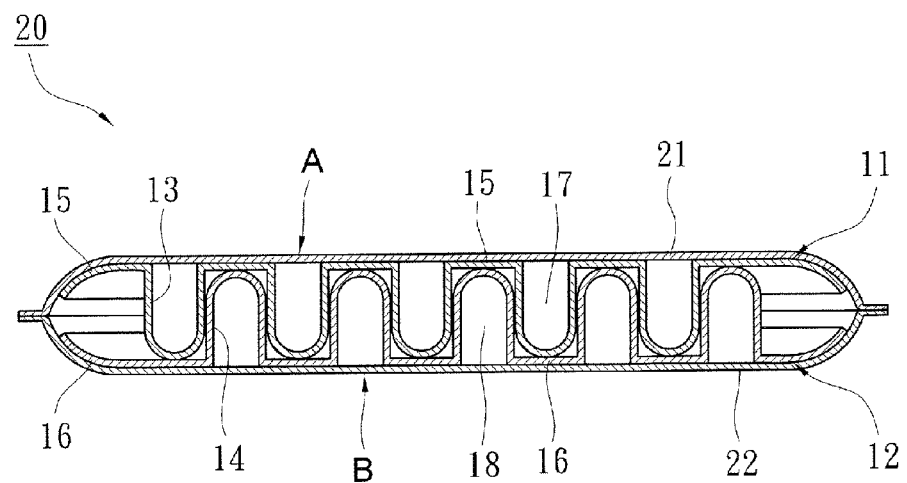
FIG. 7 is a cross-sectional view taken along line 7-7 of FIG. 6.

Referring to FIGS. 5-7, an air cushion pad constructed in accordance with another embodiment of the present invention is shown. In the instant embodiment, the air cushion pad, also designated with reference numeral 10, is composed of an upper sheet member 11 and a lower sheet member 12, which are further and respectively covered by outer enclosure films 21, 22. The upper and lower sheet members are made of resilient materials and are preferably structured in substantially the same way. Projecting hollow tubes 13 integrally formed on the upper sheet member 11 and projecting hollow tubes 14 integrally formed on the lower sheet member 12 are allowed to alternately fit between each other in an opposing manner as shown in FIG. 7. The upper sheet member 11 is then covered by the outer enclosure film 21 and the lower sheet member 12 is covered by the outer enclosure film 22. The two outer enclosure films 21, 22 are then sealed together along outer circumferences thereof by any known means, such as high-frequency machining, ultrasonic plastic fusion operation, pressurized thermal bonding, or application of adhesives, whereby the two outer enclosure films 21, 22 form therebetween an enclosed sack 20.

As shown in FIG. 7, inside the sack 20, the tubes 13 are connected to each other by a substantially flat plate 15 and the tubes 14 are connected to each other by a substantially flat plate 16, whereby the distance between adjacent tubes provided on the plate 15, 16 is substantially corresponding to or slightly greater than a diameter of the tubes 13, 14, and every four tubes 13 surround and define therebetween a cushioning and deformation space B, while every four tubes 14 surround and define therebetween a cushioning and deformation space A. The two outer enclosure films 21, 22, with the outer circumferences thereof being sealed together, allow the spaces of cavities 17, 18 defined inside the tubes 13, 14 to be completely and hermetically enclosed in a sealed sack, whereby when the sack 20 is subjected to impact by an external force, either a normal force or an inclined force, and thus compressed, the tubes 13, 14 are compressed and deformed and airs contained inside the cavities 17, 18 that undergo deformation are squeezed and displace to portions of the tubes that are not deformed. Due to the tubes 13, 14 being made of resilient materials, the tubular walls thereof are swelled and deformed, resulting in an effect of cushioning.

Figure 8:
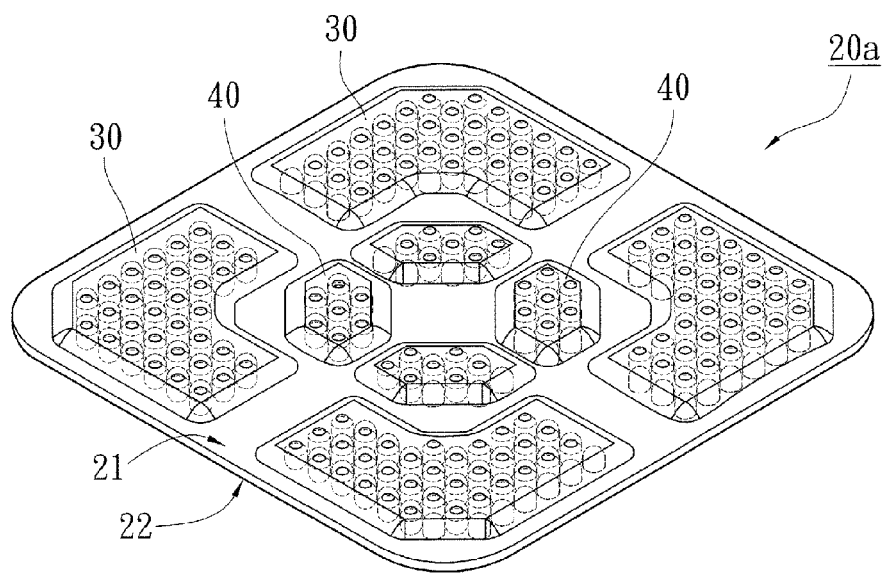
FIG. 8 is a perspective view of a cushioning pad that is constructed in accordance with the second embodiment of the present invention.

Referring to FIG. 8, a cushioning pad constructed in accordance with the present invention, generally designated with reference numeral 20a, is shown, wherein tubes 13, 14 are distributed in a localized manner. As shown, the cushioning pad 20a, which is in the form of an air sack, has four corner sections, where a great number of tubes 13, 14 are densely and respectively distributed in large zones 30, and a central portion where small zones 40 are formed in which a number of tubes 13, 14 are distributed in a localized manner. Between the large zones 30 and the small zones 40, substantially flat plates and outer enclosure films 21, 22 are connected in a multi-layered manner to thereby form a thin air sack like cushioning pad.

Figure 9:
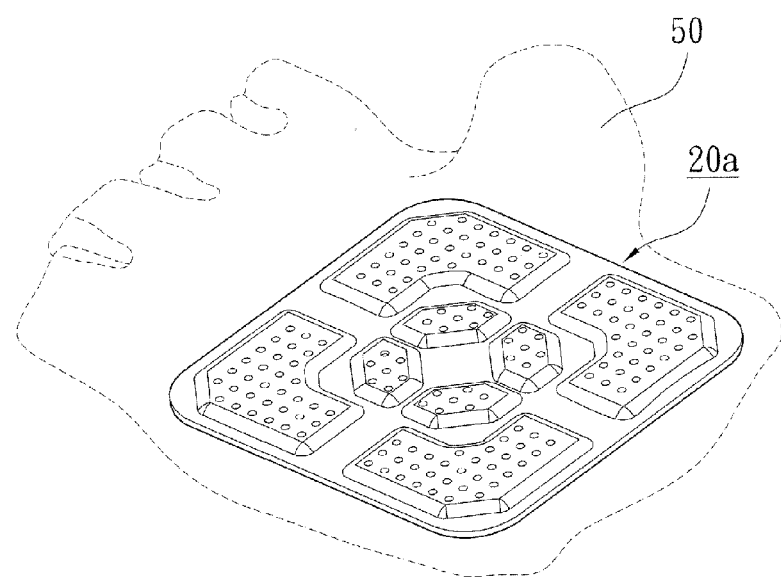
FIG. 9 is a schematic view showing the cushioning pad of the present invention applied to a glove.

Referring to FIG. 9, in an application to a glove, a cushion pad 20a of the present invention is mounted to for example the palm portion of a glove 50. The cushion pad 20a is filled up with gas and is hermetically enclosed, whereby gas pressure inside the cushion pad can be used to absorb shocks and vibrations.

Figure 10:
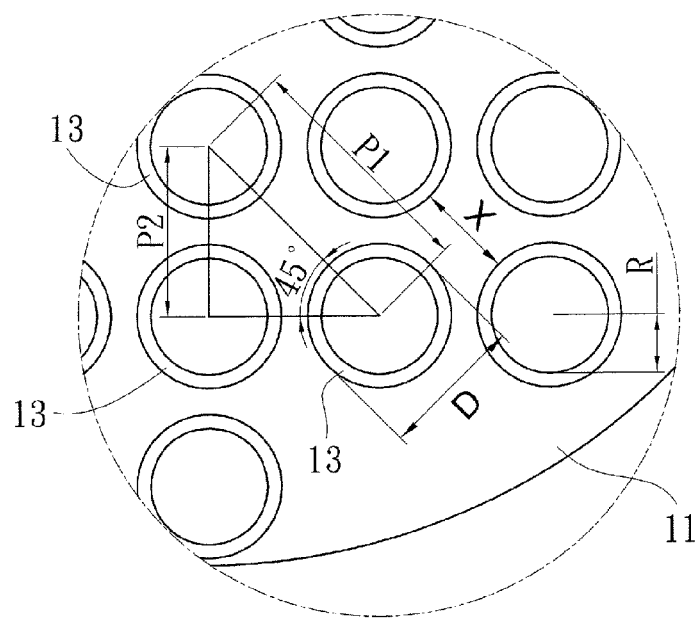
FIG. 10 is a plan view demonstrating dimension constraints for size and spacing of tubes formed on sheet members of the air cushion pad of the present invention.

Referring to FIG. 10, limitations to the size and spacing of the tubes 13 (as well as tubes 14) can be set as follows:
Definition of Parameters/Symbols:
  R=radius of tubes
  D=diameter of tubes
  X=spacing between diagonally opposing tubes
  P1=distance between centers of two diagonally opposing tubes
  P2=distance between centers of two adjacent tubes
wherein:
  $P1=X+2R$
  $2R \leq x \leq 4R$ (range of X)
  $4R \leq P1 \leq 6R$
  $2D \leq P1 \leq 3D$ (range of P1)
  $P2=P1/\sqrt{2}$
  $2D/\sqrt{2} \leq P2 \leq 3D/\sqrt{2}$ (range of P2)

Figure 11:
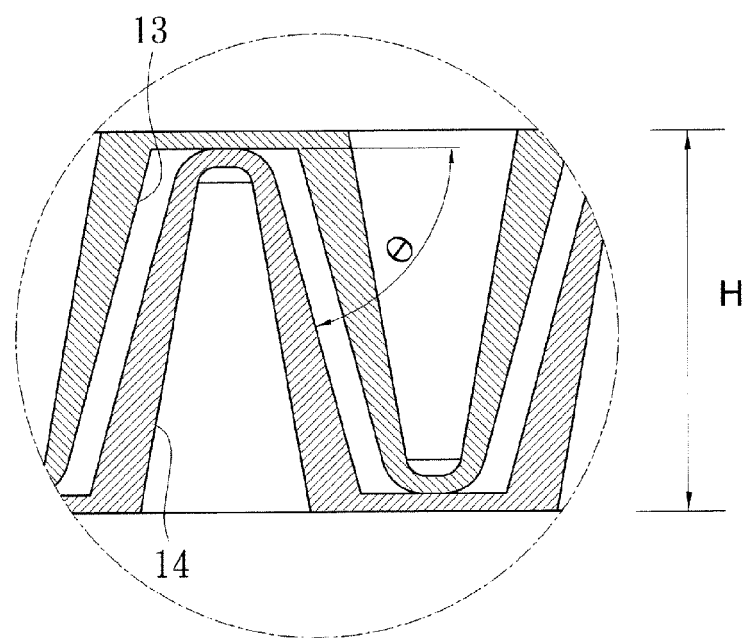
FIG. 11 is a cross-sectional view showing side walls of the tubes of the air cushion pad of the present invention are made sloping.

Referring to FIGS. 10 and 11, the height (H) of the tubes is also a factor that affects the shock absorbability of the cushion pad.

When H>3D, the tubes have a great height, whereby the tubes, when acted upon by an impact in an onward direction, allows for conversion into a great displacement in a transverse direction and significant stacking effect can be induced between tubular walls of tubes, so that a cushion pad made in this way is considered a strong impact resistant cushion pad.

When 3/2D≤H≤3D, the tubes, when acted upon by an impact in an onward direction, allows for conversion into a moderate displacement in a transverse direction and a moderate stacking effect of the tubular walls between tubes can be found. Thus, a cushion pad made in this way is considered a balanced cushion pad that is effective in resisting impact and absorbing vibration.

When H<3/2D, the tubes have a small height, whereby the tubes, when acted upon by an impact in an onward direction, allows for conversion into a small displacement in a transverse direction. Thus, a cushion pad made in this way is considered a light-load vibration-absorbing type cushion pad.

As shown in FIG. 11, according to the present invention, tubes 13, 14 can be constructed with side walls that are sloped. As shown, the side walls of the tubes 13, 14 show an included angle θ with respect to a horizontal plane. For θ=90 degrees, the maximum cushioning effect against an impact is shown. For θ<90 degrees and decremented, the resistance shown by the tubes against an impact is gradually reduced. Thus, it is possible to select a desired angle θ for forming the slope of the side walls of the tubes according to the desired property and requirement for a specific product. In other words, for a "soft" pad, which is only resistant against a light load of impact, the angle θ is made small. For a "rigid" pad, which has excellent resistance against a heavy load of impact but shows a short response of cushioning, the angle θ is made large. This feature can be adjusted according to a desired proportion to the height (H) and the diameter (D) of the tubes that are discussed previously.

Figure 12:
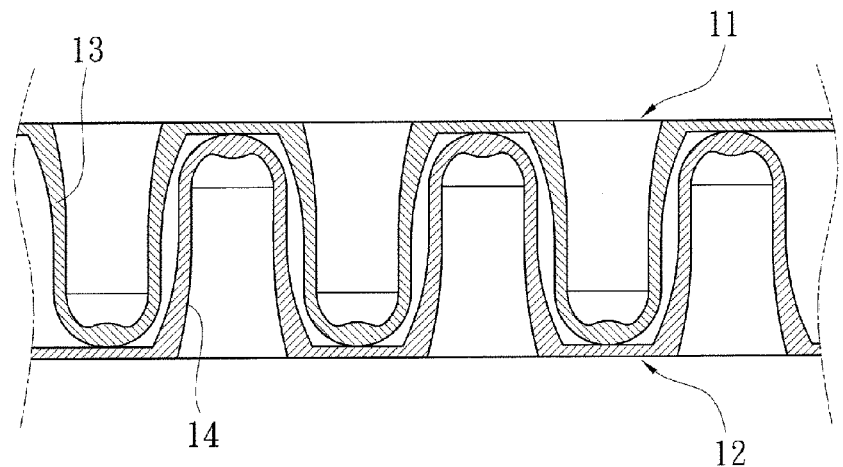
FIG. 12 is a cross-sectional view showing walls of the tubes of the air cushion pad of the present invention are of non-uniform thickness.
Figure 13:
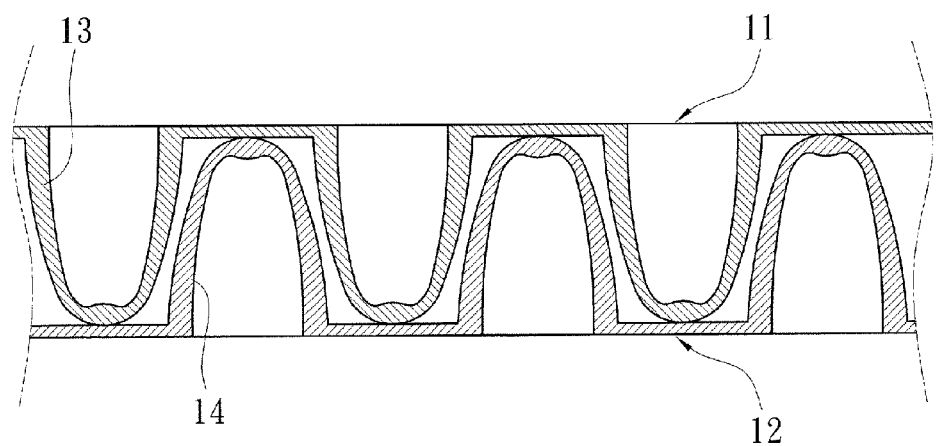
FIG. 13 is another cross-sectional view showing walls of the tubes of the air cushion pad of the present invention are of non-uniform thickness in a different configuration.
Figure 14:
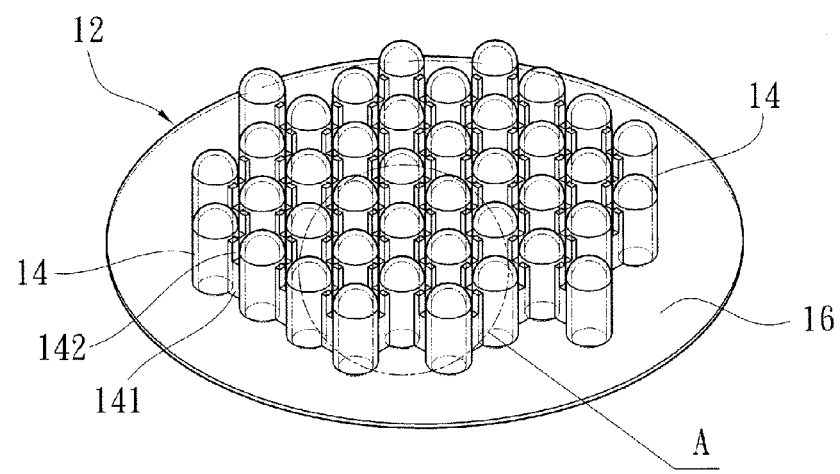
FIG. 14 is a perspective view showing an upper sheet member of an air cushion pad in accordance with a further embodiment of the present invention.
Figure 14A:
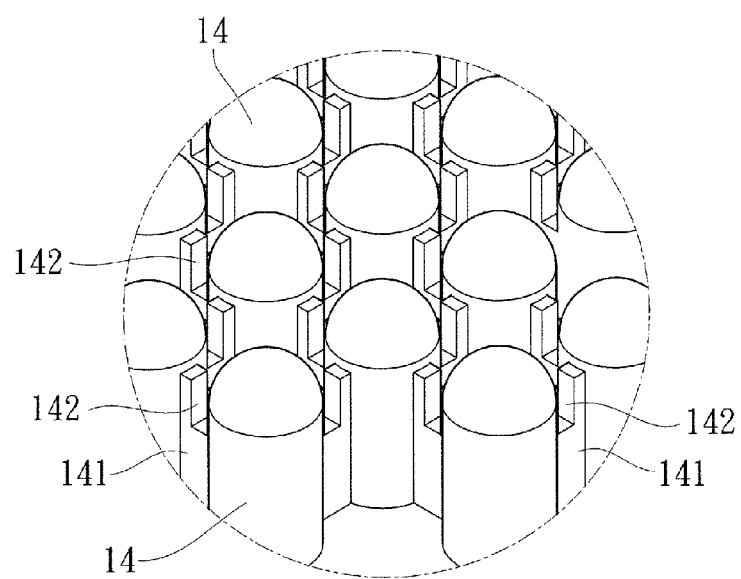
FIG. 14A is an enlarged view of a portion of the upper sheet member shown in FIG. 14.

Referring to FIGS. 12 and 13, the tubes 13, 14 can also have a side wall that is of a non-uniform thickness. As shown in FIG. 12, the tubes 13, 14 have a great wall thickness at a root portion thereof and the geometry of the side wall is not straight or linear, but is of a concave curved line, and shows a small thickness at a location close to the tip. Or alternatively, as shown in FIG. 13, the wall thickness of the tubes is made non-uniform, showing a great thickness at a root portion of the tubes 13, 14 and the geometry of the side wall is not straight or linear, but is of a convex curved line and shows a small thickness at a location close to the tip.

The tubes 13, 14 can be of a rounded or dome-shaped tip end, or alternatively, the tip end of the tubes is made flat or is of an inwardly recessed configuration.

Figure 15:
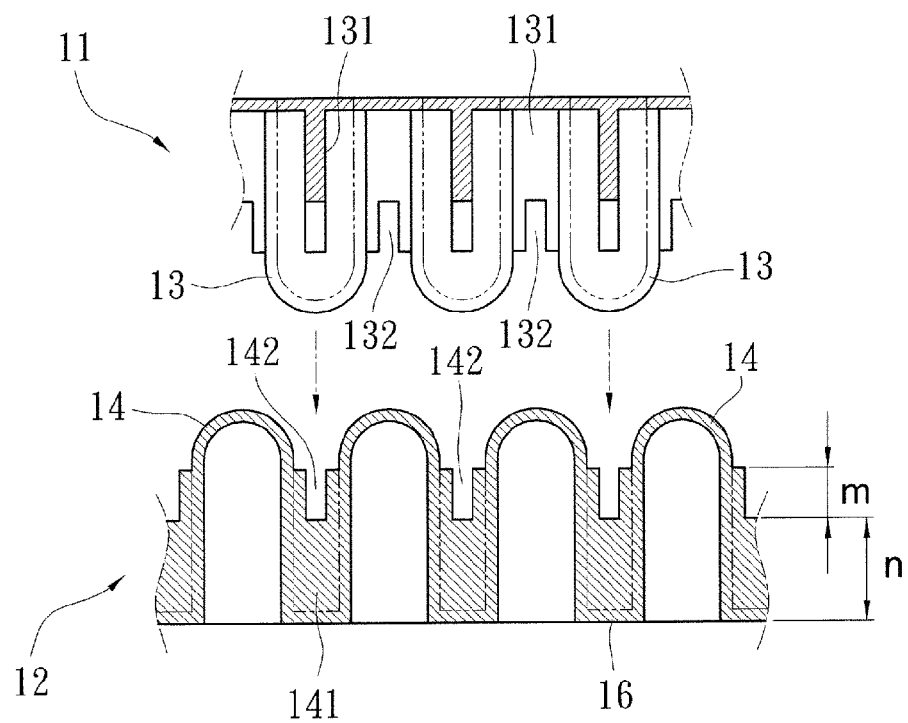
FIG. 15 is a cross-sectional view showing the upper sheet member of FIG. 14 to be assembled to a lower sheet member of the same structure.
Figure 16:
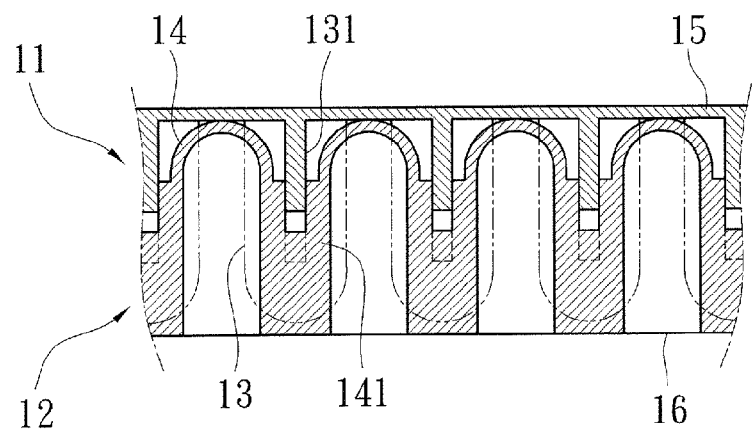
FIG. 16 is a cross-sectional view of the upper and lower sheet members of FIG. 15 assembled together.

Referring to FIGS. 14, 14A, 15, and 16, an air cushion pad constructed in accordance with a further embodiment of the present invention is of substantially the same structure as that shown in FIG. 1 formed by composing identical upper sheet member 11 and lower sheet member 12 that are fit to each other, but the lower sheet member 12 (as well as the upper sheet member 11) of the instant embodiment is of a configuration that a plurality of hollow tubes 14 (tubes 13 for the upper sheet member 11) projecting from a plate 16 and connection ribs 141 are arranged to connect between tubular walls of the tubes 14 (tubes 13 being connected by connection ribs 131) in such a way that the connection ribs 131,141 are set at a 90 degree angular interval around the tubular wall of each tube. Each of the connection ribs 141 has a top which has a central portion forming a notch 142, and each of the connection ribs 131 has a top which has a central portion forming a notch 132 (as shown in FIG. 15). Referring to FIG. 15, when upper sheet member 11 and the lower sheet member 12 are inter-fit to each other, the tubes 13, 14 are put in sideway engagement with each other and the support for the side walls of the tubes 13, 14 is enhanced, so as to realize an effect of cushioning by taking and converting an impact into deformation in a transverse direction. Preferably, the notches 142 have a recessed depth of m and the connection ribs 141 have a height of n, wherein the formula m≤n/2 is satisfied, so as to allow the notches 132 of the connection ribs 131 and the notches 142 of the connection ribs 141 to inter-fit to each other when the tubes 13, 14 are inter-fit to each other and also allow the tip ends of the tubes to be positioned in engagement with the plates 15, 16.

Referring to FIGS. 17 and 18, an air cushion pad constructed in accordance with a further embodiment of the present invention is shown, and is an expanded modification of the previous embodiment of the present invention, wherein for the structure of the upper sheet member 11 and the lower sheet member 12 according to the instant embodiment, the lower sheet member 12 (as well as the upper sheet member 11) forms a plurality of hollow tubes 14 (tubes 13 for the upper sheet member 11) projecting from a plate 16 and ribs 143 (as shown in FIG. 17A) are provided on an outer surface of the tubular wall of each tube 14 in such a way that the ribs are set at 90 degree angular interval around the outer surface of the tubular wall of the tube. Similarly, as shown in FIG. 18, each of the tubes 13 is provided, on an outer surface of a tubular wall thereof, with ribs 133. Consequently, when the tubes 13, 14 are inter-fit to each other, support for the side walls of the tubes 13, 14 can be improved.

Referring to FIGS. 19 and 20, in a further embodiment of the present invention, a lower sheet member 12 (as well as an upper sheet member 11) comprises a plate 16 from which a plurality of hollow square tubes 14a projects, while the upper sheet member 11 comprises a plate 15 from which a plurality of hollow square tubes 13a projects. Each of the square tubes 13a has a hollow interior space that forms a circular cavity 134, and each of the square tubes 14a has a hollow interior space that forms a circular cavity 144. In this way, the tubes 13a, 14a can be of a greater wall thickness in specific directions to make the tubes more resistant against impact.

Figure 21:
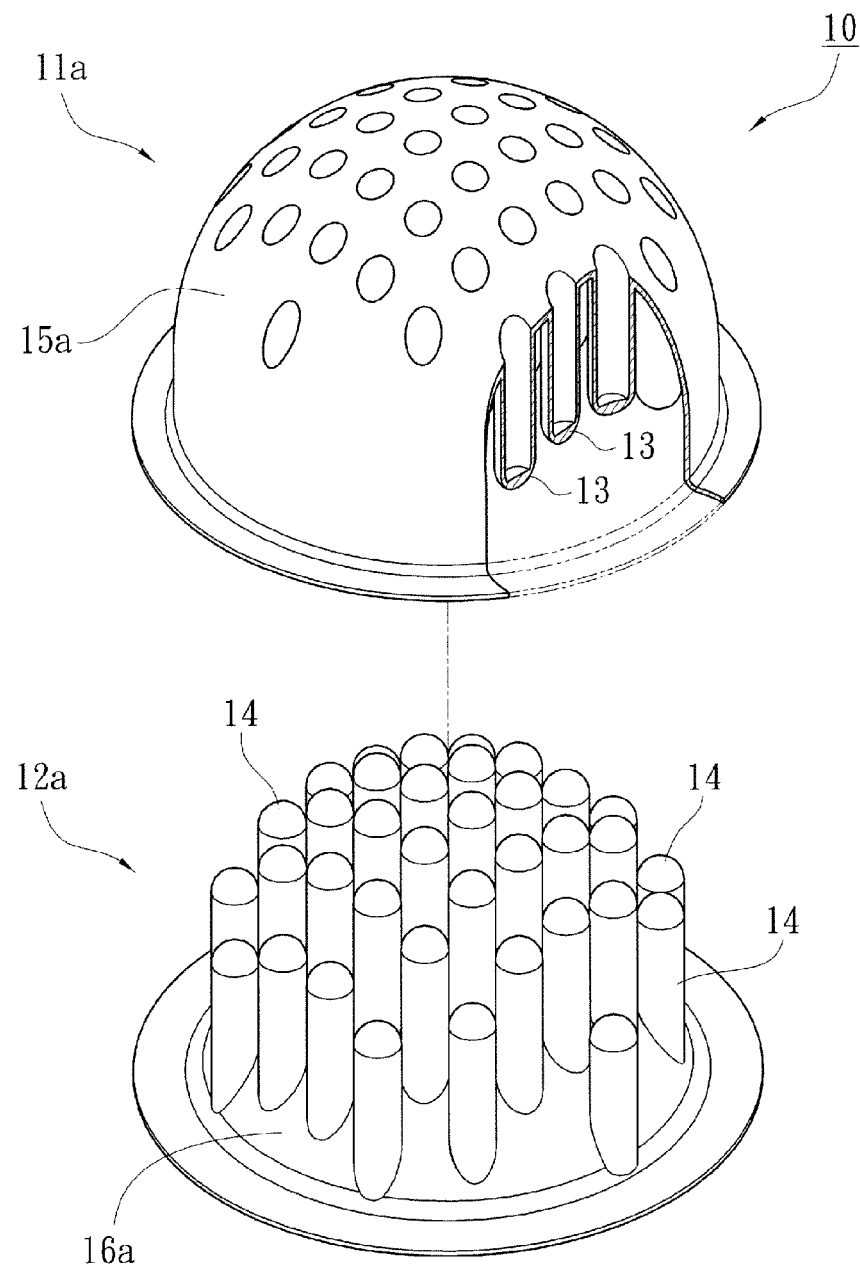
FIG. 21 is an exploded view of an air cushion pad constructed in accordance with a third embodiment of the present invention.
Figure 22:
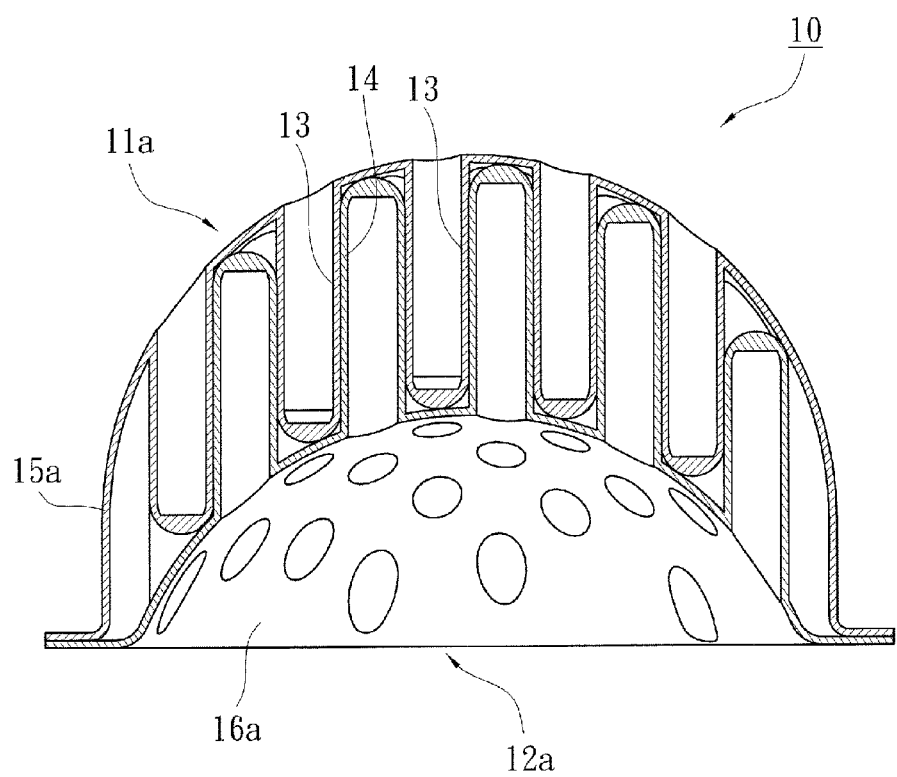
FIG. 22 is a cross-sectional view of the air cushion pad of the third embodiment of the present invention in an assembled form.

Referring to FIGS. 21 and 22, an air cushion constructed in accordance with a further embodiment of the present invention embodiment is shown, wherein the air cushion pad, generally designated at 10, is composed of an upper sheet member 11a and a lower sheet member 12a. It is noted that in the embodiments that are discussed previously, the sheet members comprise plates that are substantially flat, but in the instant embodiment, the sheet members can be selectively made in the form of a three-dimensional curved configuration. For example, the upper sheet member 11a is integrally made in a configuration having a curved surface and comprises tubes 13 that are mounted to a concave curved inside surface 15a and vertically extend downward, while the lower sheet member 12a is integrally made in a configuration having a curved surface and comprises tubes 14 that are mounted to a convex outside curved surface 16a and vertically extend upward. In this way, when the tubes 13, 14 are inter-fit to each other with circumferential edges of the concave surface 15a and the convex surface 16a abutting each other to allow for performance of high-frequency machining, ultrasonic plastic fusion operation, pressurized thermal bonding, or application of adhesives for hermetic sealing to thereby form an air sack like cushion pad.

Figure 23:
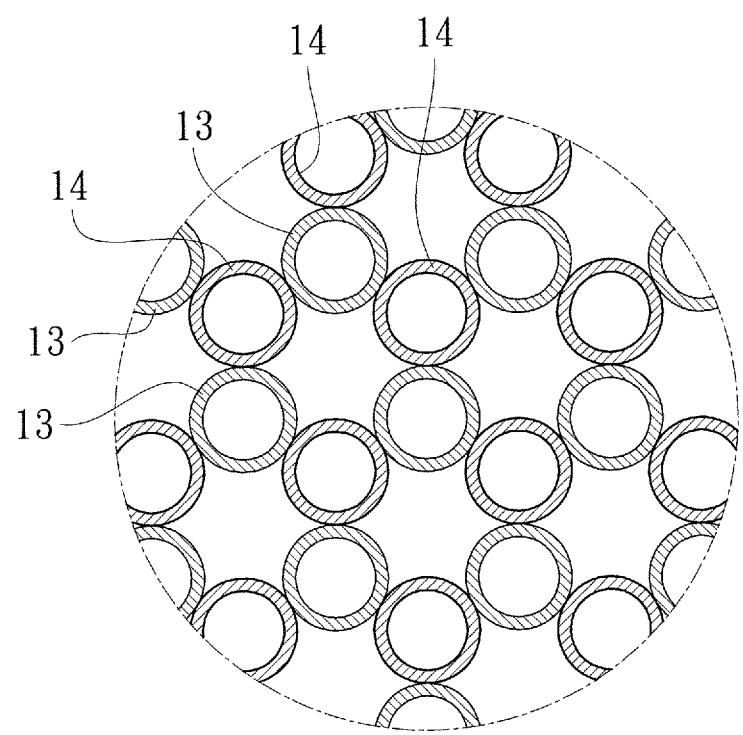
FIG. 23 shows an example arrangement of tubes of upper and lower sheet members of the air cushion pad of the present invention.

Referring to FIG. 23, in the previously discussed embodiments of the present invention, the upper sheet member and the lower sheet member comprise tubes 13, 14 that are arranged in such a spatial configuration that every four tubes surround one tube and every two tubes surround one tube along a line. However, in the instant embodiment shown in the drawing, an arrangement that three tubes surround one tube is provided, and it similarly shows an effect of cushioning.

Figure 24:
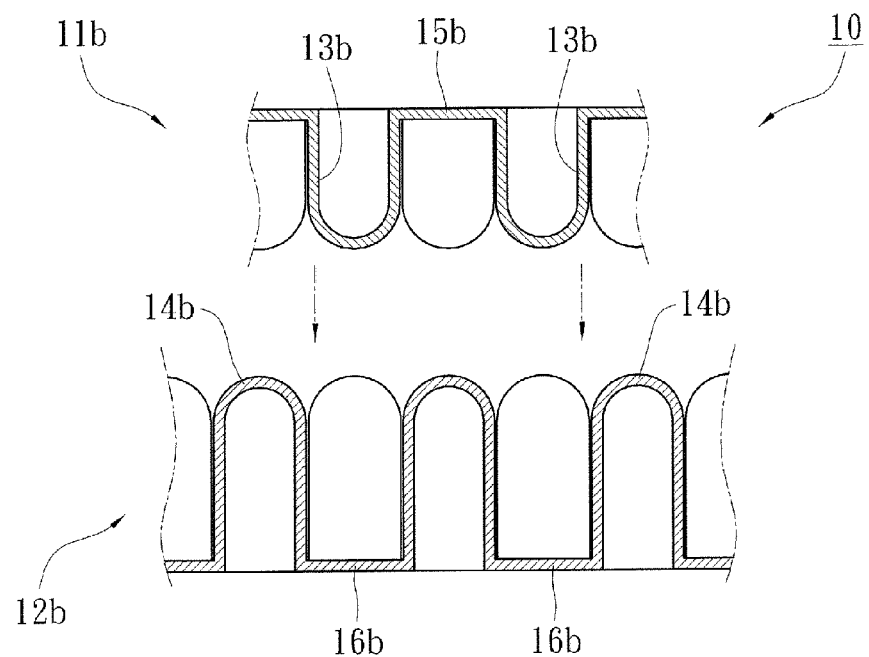
FIG. 24 is a cross-sectional view of an air cushion pad constructed in accordance with a further embodiment of the present invention comprising upper and lower sheet members that are made different.
Figure 25:
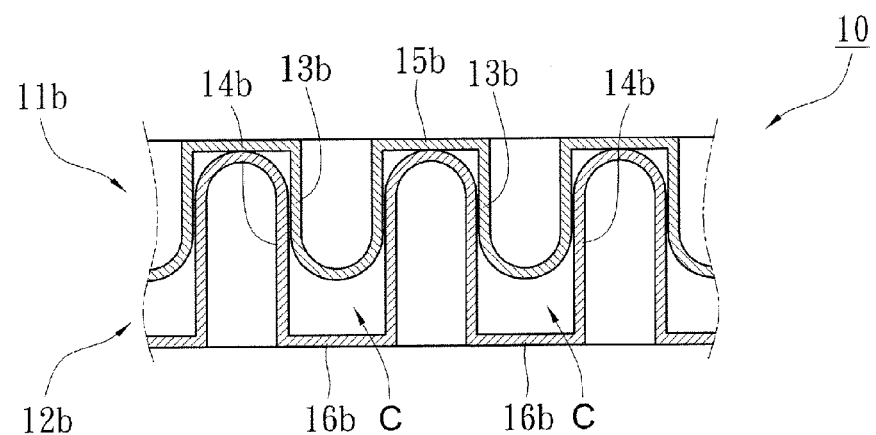
FIG. 25 is a cross-sectional view of the upper and lower sheet members of FIG. 24 assembled together.

Referring to FIGS. 24 and 25, an air cushion pad constructed in accordance with a further embodiment of the present invention, generally designated at 10, is shown. The air cushion pad 10 comprises a short-tube upper sheet member 11b and a long-tube lower sheet member 12b. The upper and lower sheet members are made of resilient materials and are constructed in different configurations, where the short-tube upper sheet member 11b comprises short hollow tubes 13b integrally formed therewith and projecting therefrom, while the long-tube lower sheet member 12b comprises long hollow tubes 14b integrally formed therewith and projecting therefrom. The short tubes 13b are connected to each other by a substantially flat plate 15b, and the long tubes 14b are connected to each other by a substantially flat plate 16b, whereby the distance between adjacent tubes of the plate 15b, 16b is substantially corresponding to or slightly greater than a diameter of the tubes 13b, 14b and thus the projecting short hollow tubes 13b and the projecting long hollow tubes 14b are allowed to alternately fit between each other in an opposing manner as shown in FIG. 25 with tip ends of the long tubes 14b, which are rounded or dome-shaped, positioned against the plate 15b and the short tubes 13b forming a gap C with respect to the plate 16b. The tubes 13b, 14b can be made with any desired heights, but with a difference maintained between the long and short tubes. Further, the tubes 13b, 14b can be made with any desired diameter. With such an arrangement, cushioning effect against impacts acting in different direction is of different result, wherein the plate 15b can offer a strong cushioning effect against an impact applying downward from an upper side, while due to the gap C, the plate 16b provides only a weak cushioning effect against an impact applying upward from a lower side.

Figure 26:
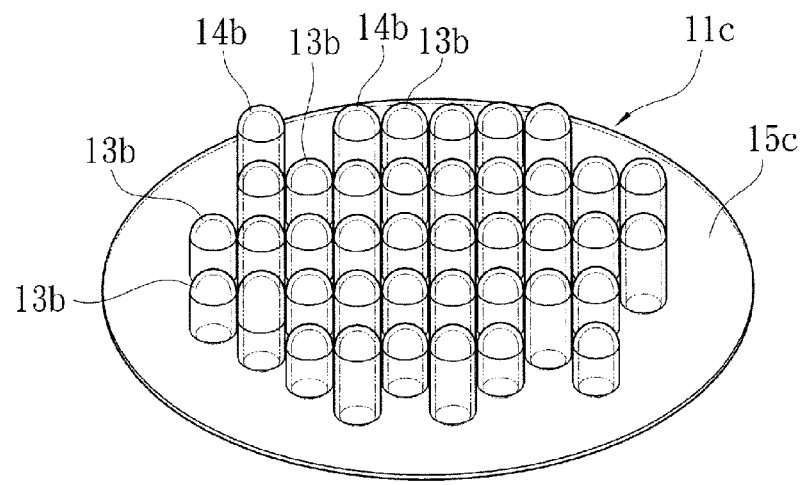
FIG. 26 is a perspective view showing an embodiment of the present invention where sheet members that constitute an air cushion pad of the present invention possess both long and short tubes.
Figure 27:
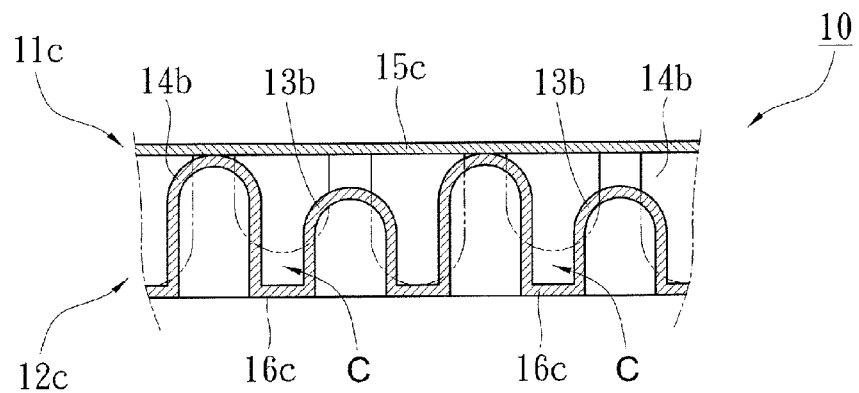
FIG. 27 is a cross-sectional view of the upper and lower sheet members of FIG. 26 assembled together

Referring to FIGS. 26 and 27, a further embodiment of the present invention provides both short tubes 13b and long tubes 14b on an upper sheet member 11c and a lower sheet member 12c and the short tubes 13b and the long tubes 14b are commonly connected to each other by a substantially flat plate 15c, while in the lower sheet member 12c, the short tubes 13b and the long tubes 14b are commonly connected to each other by a substantially flat plate 16c, whereby the upper sheet member 11c and the lower sheet member 12c allow the projecting short hollow tubes 13b and the projecting long hollow tubes 14b to fit between each other in an opposing manner as shown in FIG. 27. The short tubes 13b form a gap C with respect to the plate 15c, 16c and such gaps C are uniformly distributed over the whole air cushion pad 10, whereby the cushion pad may offer strong cushioning effect in local spots, but only have a weak cushioning effect for local spots where the gags C are formed.

Figure 28:
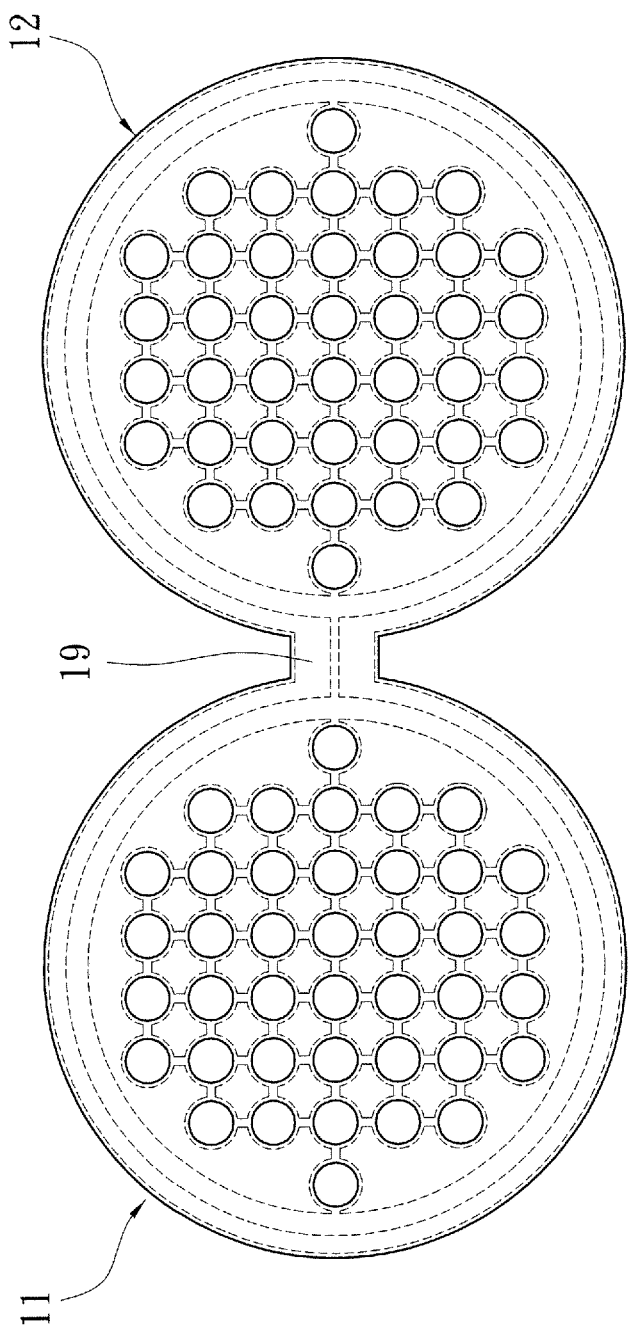
FIG. 28 is a perspective view showing an embodiment of the present invention where upper and lower sheet members are connected to each other by a thin leaf.

Referring to FIG. 28, in a further embodiment of the present invention, an upper sheet member 11 and a lower sheet member 12 are connected to each other by a thin leaf 19, whereby when the upper sheet member 11 and the lower sheet member 12 are to mate each other, efficient and easy positioning of the sheet members can be realized.

Figure 29:
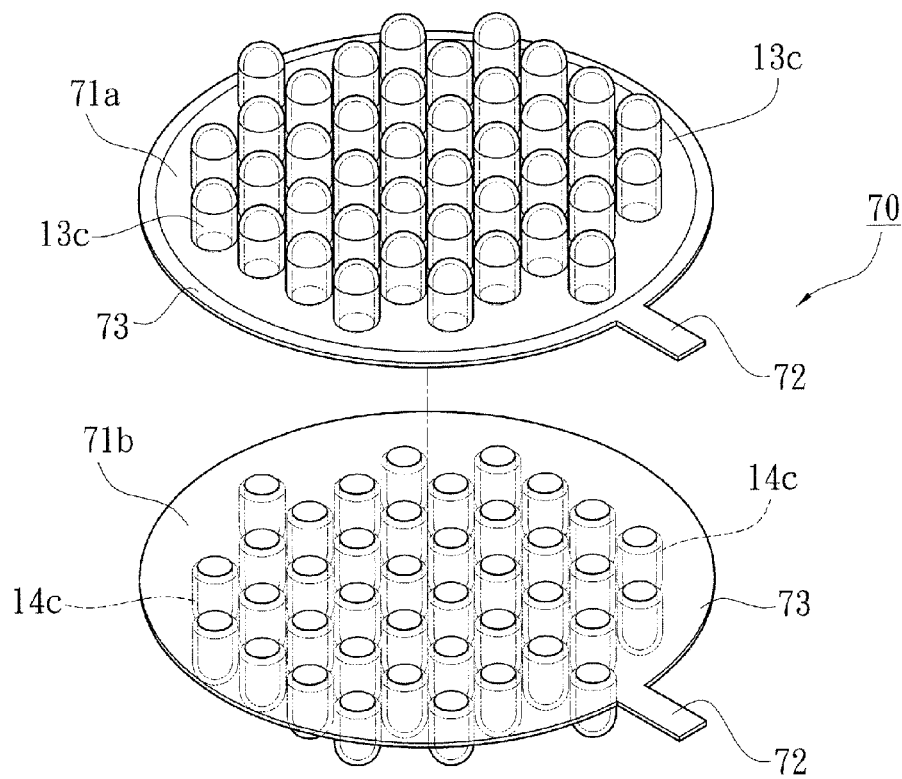
FIG. 29 is an exploded view of an air cushion pad constructed in accordance with a fourth embodiment of the present invention, which comprises a double-sided lining member.
Figure 30:
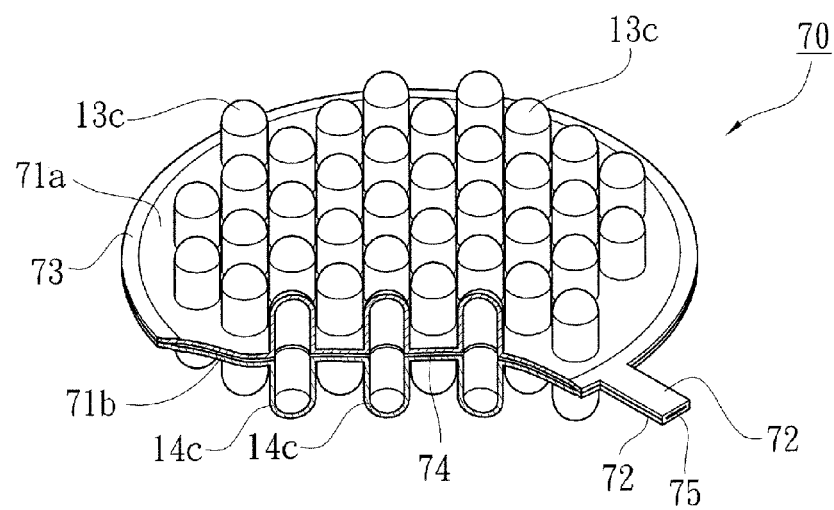
FIG. 30 is a perspective view, partially broken, of the air cushion pad of the fourth embodiment of the present invention in an assembled form.
Figure 31:
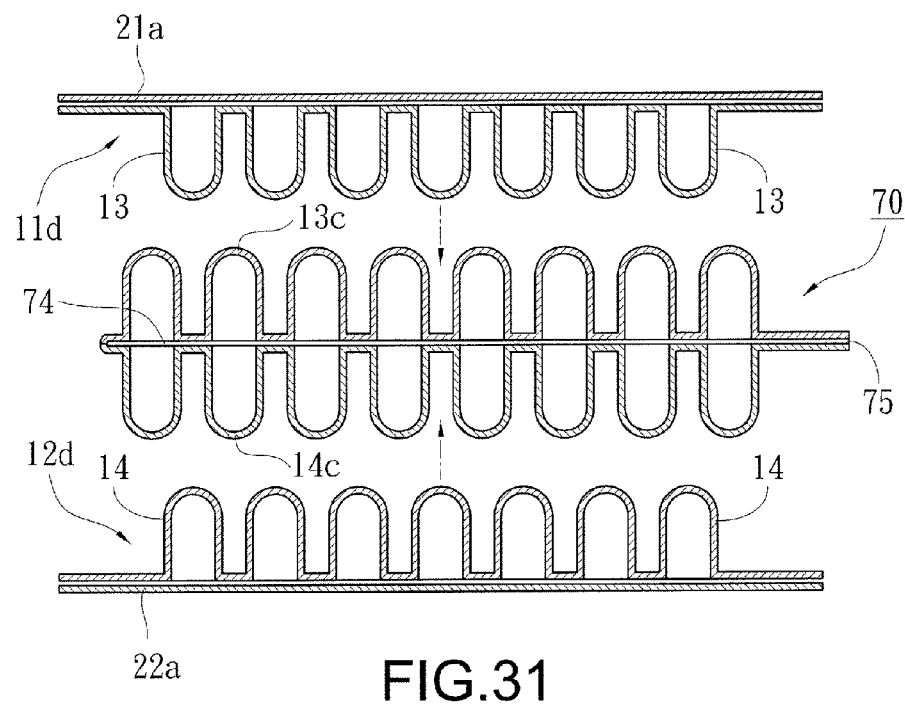
FIG. 31 is an exploded view, in sectioned form, of the air cushion pad of the fourth embodiment of the present invention.

Referring to FIGS. 29-31, in a further embodiment of the present invention, an upper sheet member 11d and a lower sheet member 12d interpose therebetween a layer of an intermediate lining. In the instant embodiment shown in the drawing, the intermediate lining comprises a double-sided lining member 70 made of a resilient material. The upper sheet member 11d and the lower sheet member 12d comprise outer enclosure films 21a, 22a set to respectively cover outside surfaces thereof. The upper sheet member 11d forms a plurality of tubes 13, and the lower sheet member 12d forms a plurality of tubes 14. The double-sided lining member is constructed as shown in FIG. 29, comprising a first sheet member 71a and a second sheet member 71b. The first sheet member 71a forms a plurality of tubes 13c and the second sheet member 71b forms a plurality of tubes 14c. An extension tab 72 extends sideway from each of the first and second sheet members and the first sheet member 71a and the second sheet member 71b are arranged to bond to each other in a back-to-back manner with sealing being made along bonding edges 73 by high-frequency machining, ultrasonic plastic fusion operation, pressurized thermal bonding, or application of adhesives, whereby the two sheet members 71a, 71b form an air sack like internal space 74 and the extension tab 72 form therebetween an air vent passage 75 communicating the outside. Thus, when the tubes 13 of the upper sheet member 11d are fit between the tubes 13c formed on an upper surface of the double-sided lining member 70 and the tubes 14 of the lower sheet member 12d are fit between the tubes 14c formed on a lower surface of the double-sided lining member 70, the two outer enclosure films 21a, 22a, the first sheet member 71a, and the second sheet member 71b are sealed together by high-frequency machining, ultrasonic plastic fusion operation, pressurized thermal bonding, or application of adhesives along common outer circumference thereof, whereby the two outer enclosure films 21a, 22a form an enclosed sack therebetween. It is also feasible to make an intermediate lining of the same function by integrally forming hollow tubes on opposite surfaces of a single plate, without forming an air sack like internal space 74 between the sheet members 71a, 71b, to replace formation of the intermediate lining by bonding an upper sheet member 11d and a lower sheet member 12d.

Figure 32:
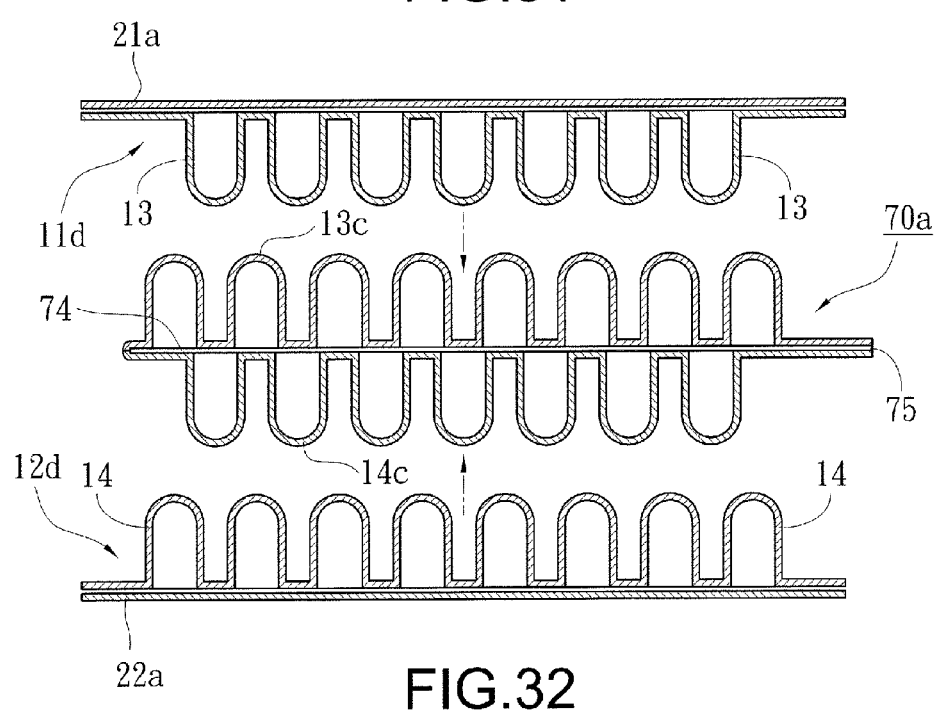
FIG. 32 is an exploded view, in sectioned form, of the air cushion pad of the fourth embodiment of the present invention, showing a different structure thereof.

Referring to FIGS. 31 and 32, a double-sided lining member 70 as shown in FIG. 31 is constructed by bonding upper-side and lower-side sheet members together with the tubes 13c formed on the upper-side sheet member and the tubes 14c formed on the lower-side sheet member in alignment with each other. A double-sided lining member 70a as shown in FIG. 32 is constructed by bonding upper-side and lower-side sheet members together with the tubes 13c formed on the upper-side sheet member and the tubes 14c formed on the lower-side sheet member arranged to alternate with respect to each other. Both ways allow for the formation of an air sack like internal space 74 between the sheet members 71a, 71b.

Figure 33:
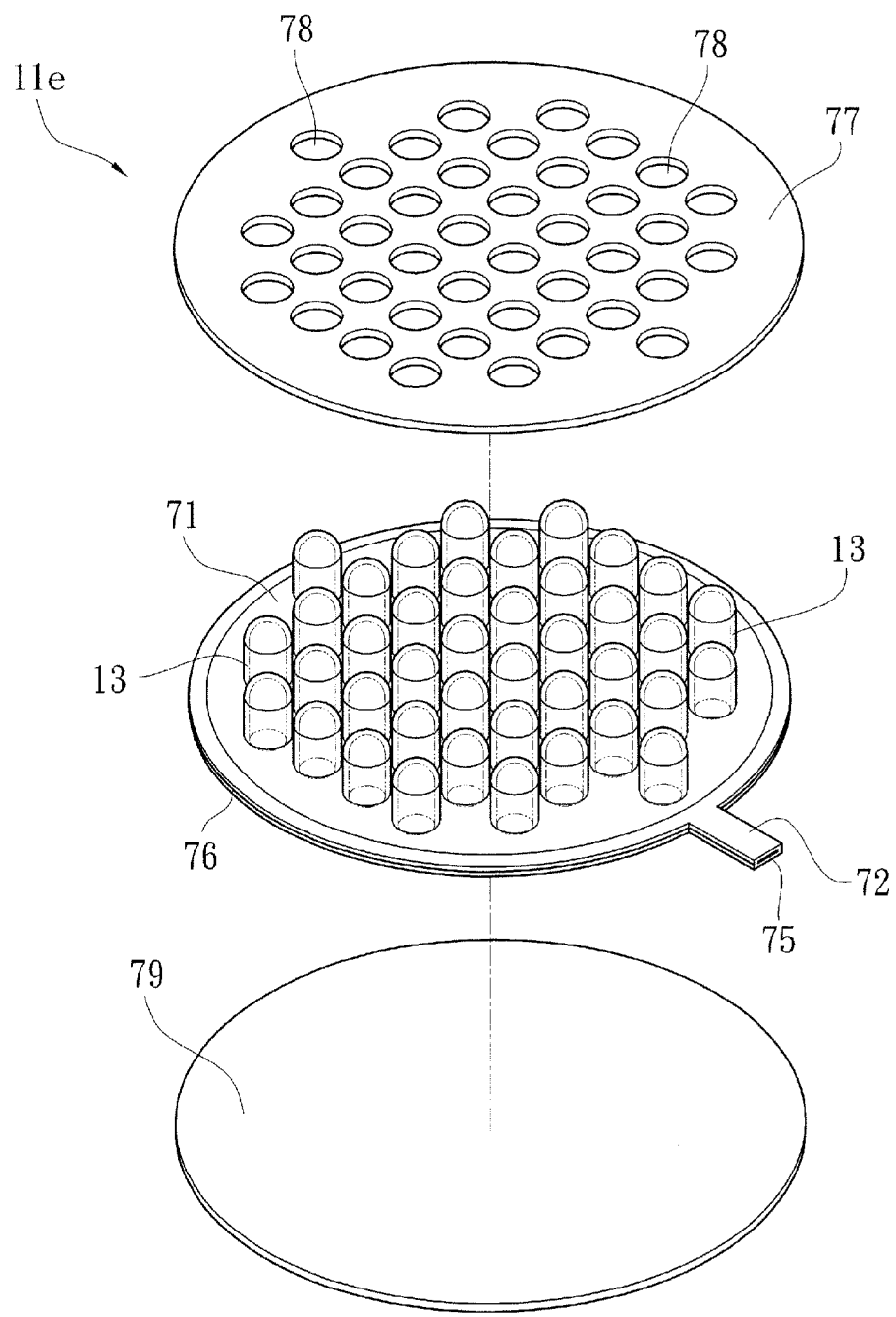
FIG. 33 is an exploded view of an upper sheet member of an air cushion pad constructed in accordance with a fifth embodiment of the present invention.
Figure 34:
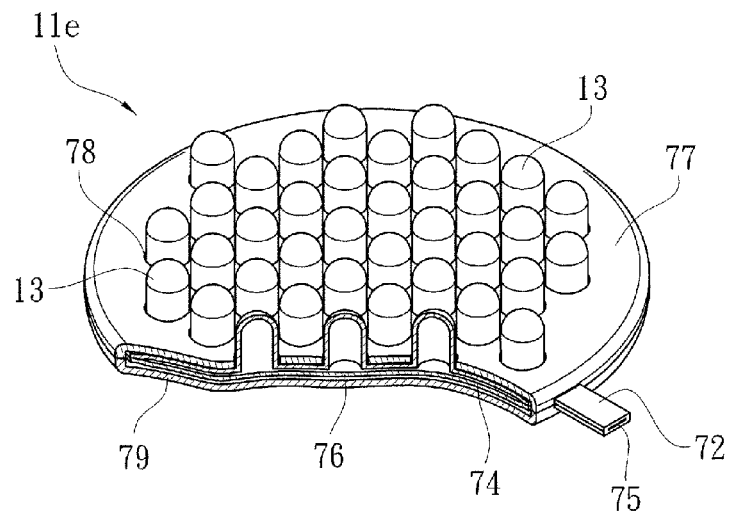
FIG. 34 is a perspective view of the upper sheet member of the air cushion pad of the fifth embodiment of the present invention in an assembled form.
Figure 35:
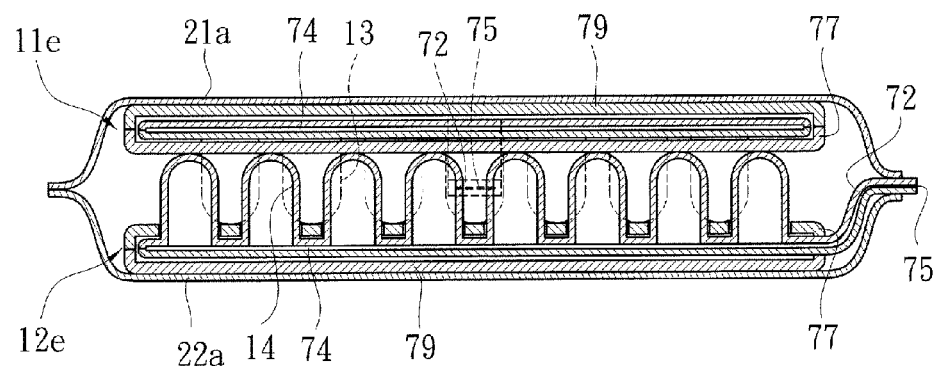
FIG. 35 is a cross-sectional view of the air cushion pad of the fifth embodiment of the present invention.

Referring to FIGS. 33-35, in a further embodiment of the present invention, an upper sheet member 11e and a lower sheet member 12e are attached to each by having tubes formed thereon inter-fit to each. And, outside surfaces of the upper sheet member 11e and the lower sheet member 12e are respectively provided with and covered by outer enclosure films 21a, 22a. The upper sheet member 11e is provided with an air vent passage 75 communicating the outside, and the lower sheet member 12e also forms an air vent passage 75 communicating the outside. With the tubes 13 of the upper sheet member 11e and the tubes 14 of the lower sheet member 12e inter-fit to each other and the two outer enclosure films 21a, 22a respectively covering the upper sheet member 11e and the lower sheet member 12e, sealing is made by high-frequency machining, ultrasonic plastic fusion operation, pressurized thermal bonding, or application of adhesives along common outer circumference to allow the two outer enclosure films 21a, 22a to form therein an enclosed sack, and the upper sheet member 11e and the lower sheet member 12e form therein air sack like internal spaces 74.

Referring to FIG. 33, the instant embodiment of the present invention will be described with the upper sheet member 11e as an example. The structure of the lower sheet member 12e is the same. The upper sheet member 11e comprises a sheet member 71, which forms thereon a plurality of tubes 13, and an extension tab 72 sideway extending therefrom. The sheet member 71 has a bottom surface to which a bottom plate 76 is attached. Sealing is made along a bonding edge 73 extending along an outer circumference of the sheet member 71 by high-frequency machining, ultrasonic plastic fusion operation, pressurized thermal bonding, or application of adhesives, whereby the sheet member 71 and the bottom plate 76 are bonded to each other to form an air sack like internal space 74 (see FIG. 35) therebetween. The extension tab 72 forms therein an air vent passage 75 in communication with the outside. A rigid upper lid 77 is provided, which forms a plurality of holes 78 corresponding, in position, to the tubes 13, whereby the rigid upper lid 77 and a rigid lower lid 79 are arranged to interpose the sheet member 71 therebetween to form the upper sheet member 11e. The lower sheet member 12e is of the same structure as the upper sheet member. Thus, when the tubes 13 of the upper sheet member 11e and the tubes 14 of the lower sheet member 12e are fit to each other, and the two outer enclosure films 21a, 22a respectively cover the upper sheet member 11e and the lower sheet member 12e, sealing is made along a common outer circumference by high-frequency machining, ultrasonic plastic fusion operation, pressurized thermal bonding, or application of adhesives to have the two outer enclosure films 21a, 22a forming therebetween an enclosed sack. In this way, the distance between the rigid upper lid 77 and the rigid lower lid 79 enhances the cushioning effect realized through air compression.

Figure 36:
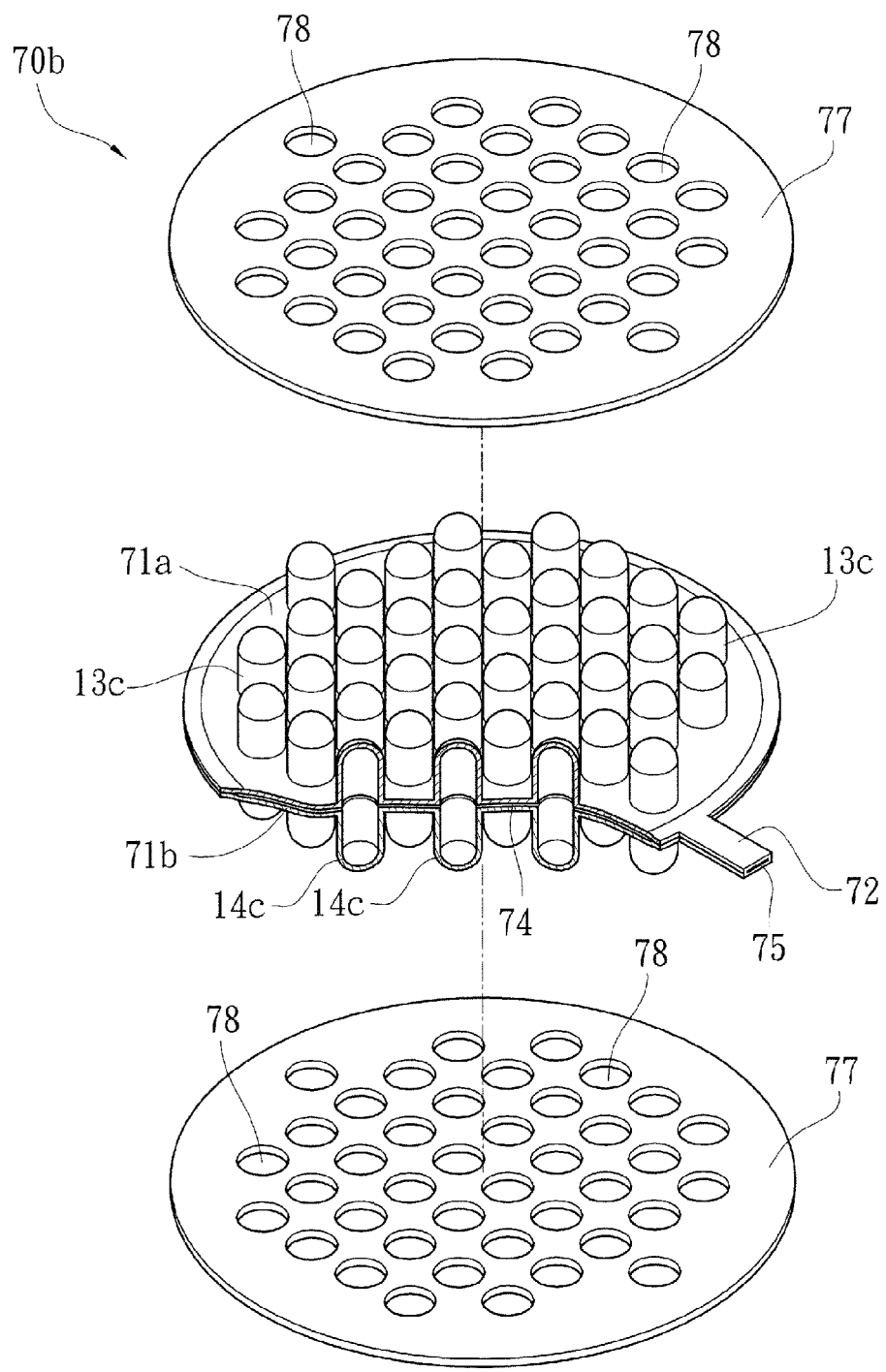
FIG. 36 is an exploded view of a double-sided lining member of an air cushion pad constructed in accordance with the present invention.
Figure 37:
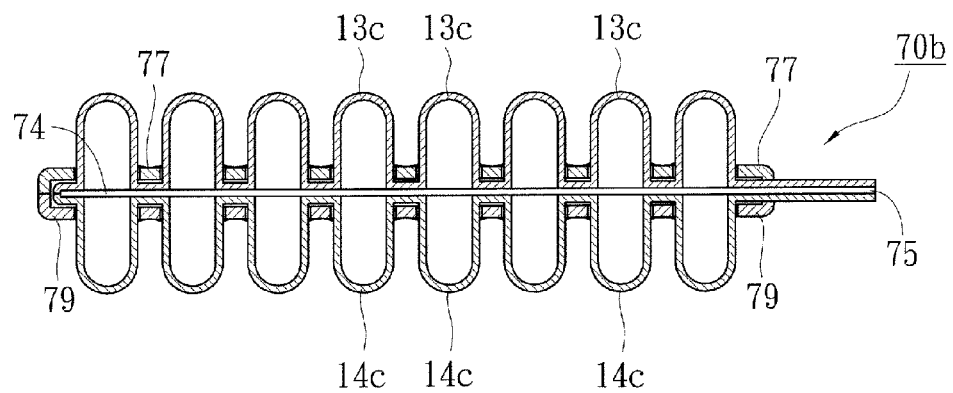
FIG. 37 is a cross-sectional view of the double-sided lining member of the present invention.
Figure 38:
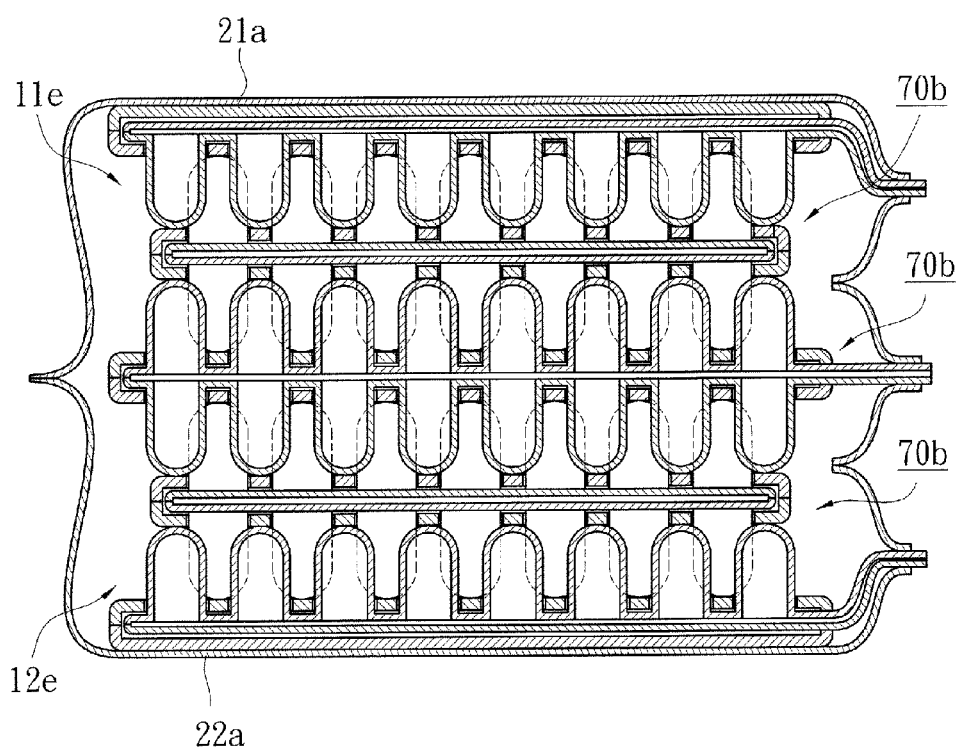
FIG. 38 is a cross-sectional view of an air cushion pad constructed in accordance with a sixth embodiment of the present invention.

Referring to FIGS. 36-38, in an embodiment of the present invention, a double-sided lining member 70b is constructed as shown in FIG. 36, which comprises a first sheet member 71a and a second sheet member 71b. The first sheet member 71a forms a plurality of tubes 13c and the second sheet member 71b forms a plurality of tubes 14c, extension tabs 72 extend sideways from the two sheet members. The first sheet member 71a and the second sheet member 71b are bonded to each other in a back-to-back manner and sealing is made along bonding edges 73 extending along outer circumferences by high-frequency machining, ultrasonic plastic fusion operation, pressurized thermal bonding, or application of adhesives, whereby the two sheet members 71a, 71b form therebetween an air sack like internal space 74, and the extension tabs 72 form therein an air vent passage 75 communicating the outside. Further, in a feasible embodiment that is not shown in the drawings, the extension tabs 72 are omitted and the bonding edges 73 extending completely along the outer circumferences are sealed to each other to enclose the air sack like internal space 74 sealed inside. A rigid upper lid 77 is provided, which forms a plurality of holes 78 corresponding, in position, to the tubes 13, whereby the rigid upper lid 77 and a rigid lower lid 79 interpose the sheet members 71 therebetween to form a double-sided lining member 70b. As shown in FIG. 38, the present invention allows an upper sheet member 11e, a lower sheet member 12e, and a plurality of double-sided lining members 70b combined together with the tubes inter-fit each other and outside surfaces of the upper sheet member 11e and the lower sheet member 12e, which are located at the outermost locations, are respectively provided with and covered by outer enclosure films 21a, 22a.

The air cushion pad according to the present invention uses the compression of air to absorb vibration. With a plurality of projecting single-axis tubes mutually engaging each other to serve as a shock absorption material, when an impact is applied, the tubular walls of tubes undergo transverse displacement and deformation. When the deformation is great, the deformation progresses to the neighboring tubes. And thus, a chain reaction can be expected to gradually expand the area in which cushioning is performed to take the impact, so that the impact can be resisted and shock absorbed by change of angle of the wall thickness of the single-axis tubes. Thus, transverse distance and longitudinal distance of the single-axis tubes of the air cushion pad do not need to be fixed, and further, the wall thickness of the single-axis does not need to be fixed either, and variation of the thickness is allowable.

To summarize, the air cushion pad according to the present invention shows the following advantages:

(1) The air cushion pad is constructed with simple components and offers various modes of shock absorption, and thus allows for applications in various sites where shock absorption and cushioning is needed.

(2) The air cushion pad can be hermetically sealed as an air sack like cushion pad, where shock suppression can be realized through air pressure induced inside the air sack by displacing a limited amount of air contained inside the air cushion pad.

(3) The air cushion pad can be mounted to a glove to realize impact cushioning for the glove so as to provide the effects of shock suppression and protection.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An air cushion arrangement, comprising:
   a first air cushion assembly, comprising:
   a first sheet member, which is resilient and has a first surface on which a plurality of hollow tubes is raised and an opposite second surface in which an opening is formed for each of the hollow tubes, the first sheet member having a first circumference from which a first extension tab extends sideways;
   a second sheet member, which is resilient and has a third surface that opposes the second surface of the first sheet member, the second sheet member having a second circumference corresponding to and hermetically bonded to the first circumference of the first sheet member to form an internal space between the second surface and the third surface, a second extension tab extending sideways from the second circumference and corresponding to and bonded to the first extension tab to define an air passage therebetween, the air passage being in communication with the internal space and selectively sealed;
   a first lid, which is a single stiff plate positioned on the first surface of the first sheet member, holes being formed through the lid and corresponding to and receiving therethrough the hollow tubes of the first sheet member;
   a second air cushion assembly, comprising:
   a third sheet member, which is resilient and has a fifth surface on which a plurality of hollow tubes is raised and an opposite sixth surface in which an opening is formed for each of the hollow tubes, the third sheet member having a third circumference from which a third extension tab extends sideways;
   a fourth sheet member, which is resilient and has a seventh surface that opposes the sixth surface of the third sheet member, the fourth sheet member having a fourth circumference corresponding to and hermetically bonded to the third circumference of the third sheet member to form an internal space between the sixth surface and the seventh surface, a fourth extension tab extending sideways from the fourth circumference and corresponding to and bonded to the third extension tab to define an air passage therebetween, the air passage being in communication with the internal space and selectively sealed;

a third lid, which is a single stiff plate positioned on the fifth surface of the third sheet member, holes being formed through the lid and corresponding to and receiving therethrough the hollow tubes of the third sheet member; and a flexible enclosure that encloses the first and second air cushion assemblies therein, wherein the enclosure comprises two flexible films that have circumferences hermetically bonded to each other;

wherein the first and second air cushion assemblies are arranged to couple to each other with the hollow tubes of the first and second air cushion assemblies coupled with each other.

2. The air cushion arrangement according to claim 1, wherein the second sheet member has a fourth surface that is opposite to the third surface and the first air cushion assembly further comprises a second lid, which is a single stiff plate positioned on the fourth surface of the second sheet member, whereby the first and second sheet members are interposed between the first and second lids.

3. The air cushion arrangement according to claim 1, wherein the air passage of at least one of the first and second air cushion assemblies extends outside the enclosure.

4. The air cushion arrangement according to claim 3, wherein the enclosure comprises two flexible films that have circumferences hermetically bonded to each other with the air passage extending therebetween.

5. The air cushion arrangement according to claim 1, wherein the first and second air cushion assemblies are coupled to each other with the hollow tubes thereof inter-fitting to each other.

6. The air cushion arrangement according to claim 1, further comprising a third air cushion assembly that is arranged between the first and second air cushion assemblies to engage the hollow tubes of the first and second air cushion assemblies so as to couple the first and second air cushion assemblies to each other, the third air cushion assembly comprising:

a fifth sheet member, which is resilient and has a ninth surface on which a plurality of hollow tubes is raised and an opposite tenth surface in which an opening is formed for each of the hollow tubes, the fifth sheet member having a fifth circumference from which a fifth extension tab extends sideways;

a sixth sheet member, which is resilient and has an eleventh surface and an opposite twelfth surface on which a plurality of hollow tubes is raised, the eleventh surface opposing the tenth surface of the fifth sheet member and comprising openings formed therein to respectively corresponding to the hollow tubes of the twelfth surface, the sixth sheet member having a sixth circumference corresponding to and hermetically bonded to the fifth circumference of the fifth sheet member to form an internal space between the tenth surface and the eleventh surface, a sixth extension tab extending sideways from the sixth circumference and corresponding to and bonded to the fifth extension tab to define an air passage therebetween, the air passage being in communication with the internal space and selectively sealed;

a fifth lid, which is a single stiff plate positioned on the ninth surface of the fifth sheet member, holes being formed through the lid and corresponding to and receiving therethrough the hollow tubes of the fifth sheet member; and a sixth lid, which is a single stiff plate positioned on the twelfth surface of the sixth sheet member, holes being formed through the lid and corresponding to and receiving therethrough the hollow tubes of the sixth sheet member, whereby the fifth and sixth sheet members are interposed between the fifth and sixth lids;

wherein the third air cushion assembly is arranged between the first and second air cushion assemblies in such a way that the hollow tubes of the fifth sheet member and the hollow tubes of the first sheet member inter-fit to each other and the hollow tubes of the sixth sheet member and the hollow tubes of the third sheet member inter-fit to each other so as to couple the first and second air cushion assemblies to each other via the third air cushion assembly.

7. The air cushion arrangement according to claim 6, further comprising a flexible enclosure that encloses the first, second, and third air cushion assemblies therein.

8. The air cushion arrangement according to claim 7, wherein the air passage of at least one of the first, second, and third air cushion assemblies extends outside the enclosure.

9. The air cushion arrangement according to claim 7, wherein the enclosure comprises two flexible films that have circumferences hermetically bonded to each other.

10. The air cushion arrangement according to claim 8, wherein the enclosure comprises two flexible films that have circumferences hermetically bonded to each other with the air passage extending therebetween.

11. The air cushion arrangement according to claim 2, further comprising:

a second air cushion assembly, comprising:

a third sheet member, which is resilient and has a fifth surface on which a plurality of hollow tubes is raised and an opposite sixth surface in which an opening is formed for each of the hollow tubes, the third sheet member having a third circumference from which a third extension tab extends sideways;

a fourth sheet member, which is resilient and has a seventh surface that opposes the sixth surface of the third sheet member and an opposite eighth surface, the fourth sheet member having a fourth circumference corresponding to and hermetically bonded to the third circumference of the third sheet member to form an internal space between the sixth surface and the seventh surface, a fourth extension tab extending sideways from the fourth circumference and corresponding to and bonded to the third extension tab to define an air passage therebetween, the air passage being in communication with the internal space and selectively sealed;

a third lid, which is a single stiff plate positioned on the fifth surface of the third sheet member, holes being formed through the lid and corresponding to and receiving therethrough the hollow tubes of the third sheet member; and a fourth lid, which is a single stiff plate positioned on the eighth surface of the fourth sheet member, whereby the third and fourth sheet members are interposed between the third and fourth lids;

wherein the first and second air cushion assemblies are arranged to couple to each other with the hollow tubes of the first and second air cushion assemblies coupled to each other.

12. The air cushion arrangement according to claim 11, further comprising a third air cushion assembly that is arranged between the first and second air cushion assemblies to engage the hollow tubes of the first and second air cushion assemblies so as to couple the first and second air cushion assemblies to each other, the third air cushion assembly comprising:
- a fifth sheet member, which is resilient and has a ninth surface on which a plurality of hollow tubes is raised and an opposite tenth surface in which an opening is formed for each of the hollow tubes, the fifth sheet member having a fifth circumference from which a fifth extension tab extends sideways;
- a sixth sheet member, which is resilient and has an eleventh surface and an opposite twelfth surface on which a plurality of hollow tubes is raised, the eleventh surface opposing the tenth surface of the fifth sheet member and comprising openings formed therein to respectively corresponding to the hollow tubes of the twelfth surface, the sixth sheet member having a sixth circumference corresponding to and hermetically bonded to the fifth circumference of the fifth sheet member to form an internal space between the tenth surface and the eleventh surface, a sixth extension tab extending sideways from the sixth circumference and corresponding to and bonded to the fifth extension tab to define an air passage therebetween, the air passage being in communication with the internal space and selectively sealed;
- a fifth lid, which is a single stiff plate positioned on the ninth surface of the fifth sheet member, holes being formed through the lid and corresponding to and receiving therethrough the hollow tubes of the fifth sheet member; and
- a sixth lid, which is a single stiff plate positioned on the twelfth surface of the sixth sheet member, holes being formed through the lid and corresponding to and receiving therethrough the hollow tubes of the sixth sheet member, whereby the fifth and sixth sheet members are interposed between the fifth and sixth lids;
- wherein the third air cushion assembly is arranged between the first and second air cushion assemblies in such a way that the hollow tubes of the fifth sheet member and the hollow tubes of the first sheet member inter-fit to each other and the hollow tubes of the sixth sheet member and the hollow tubes of the third sheet member inter-fit to each other so as to couple the first and second air cushion assemblies to each other via the third air cushion assembly.

13. The air cushion arrangement according to claim 12, further comprising a flexible enclosure that encloses the first, second, and third air cushion assemblies therein.

14. The air cushion arrangement according to claim 13, wherein the air passage of at least one of the first, second, and third air cushion assemblies extends outside the enclosure.

15. The air cushion arrangement according to claim 13, wherein the enclosure comprises two flexible films that have circumferences hermetically bonded to each other.

16. The air cushion arrangement according to claim 14, wherein the enclosure comprises two flexible films that have circumferences hermetically bonded to each other with the air passage extending therebetween.

17. The air cushion arrangement according to claim 11, further comprising a flexible enclosure that encloses the first and second air cushion assemblies therein.

\* \* \* \* \*